United States Patent
Wen et al.

(10) Patent No.: US 11,430,049 B2
(45) Date of Patent: Aug. 30, 2022

(54) COMMUNICATION VIA SIMULATED USER

(71) Applicant: Samsung Electronics Co., Ltd., Suwon-si (KR)

(72) Inventors: Xue Wen, Beijing (CN); Shenjian Wang, Beijing (CN); Lina Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 16/522,180

(22) Filed: Jul. 25, 2019

(65) Prior Publication Data

US 2020/0034917 A1 Jan. 30, 2020

(30) Foreign Application Priority Data

Jul. 25, 2018 (CN) .......................... 201810826598.8

(51) Int. Cl.
| | | |
|---|---|---|
| *G06Q 30/06* | (2012.01) | |
| *H04L 51/02* | (2022.01) | |
| *H04L 9/40* | (2022.01) | |
| *H04L 67/306* | (2022.01) | |

(52) U.S. Cl.
CPC ......... *G06Q 30/0641* (2013.01); *H04L 51/02* (2013.01); *H04L 63/0421* (2013.01); *H04L 67/306* (2013.01)

(58) Field of Classification Search
CPC . H04L 51/02; H04L 63/0421; H04L 63/1491; H04L 67/22; H04L 67/306; H04L 41/145; G06F 21/6245; G06Q 30/0641
USPC ...................................................... 705/27.1
See application file for complete search history.

(56) References Cited

U.S. PATENT DOCUMENTS

| | | | |
|---|---|---|---|
| 8,112,405 B2 | 2/2012 | Shiloh | |
| 2009/0292696 A1* | 11/2009 | Shuster | ................. G06F 16/951 |
| 2014/0359782 A1 | 12/2014 | Golic | |
| 2016/0253710 A1* | 9/2016 | Publicover | ......... H04N 21/4532 |
| | | | 705/14.66 |
| 2017/0124205 A1* | 5/2017 | Shaam | .............. G06F 16/24552 |
| 2017/0142158 A1* | 5/2017 | Laoutaris | ................ H04L 67/02 |
| 2018/0121553 A1* | 5/2018 | Bostick | ............... G06F 16/9535 |
| 2018/0247247 A1* | 8/2018 | Xu | ......................... G06F 16/951 |
| 2018/0350144 A1* | 12/2018 | Rathod | ............. G06Q 20/3276 |
| 2019/0325498 A1* | 10/2019 | Clark | ................... G06K 7/1417 |

FOREIGN PATENT DOCUMENTS

| | | | | |
|---|---|---|---|---|
| JP | 2007-183859 A | | 7/2007 | |
| JP | 2007183859 | * | 7/2007 | ............. G06F 17/30 |
| WO | 2009/132664 A1 | | 11/2009 | |

OTHER PUBLICATIONS

International Search Report dated Oct. 25, 2019, issued in International Application No. PCT/KR2019/009290.
European Search Report dated Jul. 22, 2021, issued in European Application No. 19841017.7.

* cited by examiner

*Primary Examiner* — Frantz B Jean
(74) *Attorney, Agent, or Firm* — Jefferson IP Law, LLP

(57) ABSTRACT

An electronic device is provided. The electronic device includes a memory storing instructions, and at least one processor configured to execute the instructions to obtain a request of a user which is input for a provider, and provide a result obtained by transmitting to the provider at least one simulated request of at least one simulated user corresponding to the request.

18 Claims, 19 Drawing Sheets

COMMUNICATION VIA SIMULATED USER

CROSS-REFERENCE TO RELATED APPLICATION(S)

This application is based on and claims priority under 35 U.S.C. § 119(a) of a Chinese patent application number 201810826598.8, filed on Jul. 25, 2018, in the Chinese Patent Office, the disclosure of which is incorporated by reference herein in its entirety.

BACKGROUND

1. Field

The disclosure relates to communication via a simulated user. More particularly, the present disclosure relates to technologies for requesting or providing contents through a simulated user.

2. Description of the Related Art

With widely application of the Internet and a rise of various kinds of network platforms for shopping, information sharing, socializing, entertaining, and etc., acquiring a recommend content, retrieving a result, and etc. through a Content Provider (CP) occur around us all the time. Interactions between content providers and users includes initiating, by the user, a request to the content provider with respect to a requirement of the user itself, and returning, by the content provider, a series of results to the user in response to the request.

At the same time, a user profiling technique is wildly used in a procedure of providing the content to the user by various content providers as well. Based on a series of requests of the user, the content provider may acquire information of the user, such as interest and etc., through the user profiling technique, and then push the content conforming to the user's individual preference to the user based on such information.

For example, comparing to searching a commodity on a certain online shopping platform by a user with an anonymous identity, if the user performs the same search on the online shopping platform with a registered identity, then the commodity which is recommended to the user by the online shopping platform may make the user to have more buying desire. That is because that the online shopping platform can acquire a preference of the user through a user profiling technique, based on a history request of the registered user, so as to recommend a search result more conforming to an individual preference of the user to the user. Through the user profiling technique starting from a content provider, the commodity which can make the user produce a purchase action more likely may be recommended to the user in priority. Not only time cost and vigor cost of searching and browsing of the user can be saved, but also more transactions can be promoted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a memory storing instructions, and at least one processor configured to execute the instructions to obtain a request of user for a provider, and provide a result obtained by transmitting to the provider at least one simulated request of at least one simulated user.

Additional aspects will be set forth in part in the description which follows and, in part, will be apparent from the description, or may be learned by practice of the presented embodiments.

In accordance with an aspect of the disclosure, a method of requesting a content is provided. The method includes acquiring a request of a first user which is used for requesting a content provider to provide a content, and transmitting, to the content provider, a simulated request corresponding to the request.

In an embodiment of the disclosure, the transmitting, to the content provider, the simulated request corresponding to the request includes selecting a simulated user, acquiring the simulated request corresponding to the selected simulated user according to the request, and transmitting, to the content provider, the simulated request corresponding to the selected simulated user.

In one embodiment of the disclosure, the selecting the simulated user includes selecting the simulated user from a simulated user pool, based on a correlation between the simulated user and the first user, and/or based on a correlation between the simulated user and the request.

In one embodiment of the disclosure, the selecting the simulated user includes selecting the simulated user from the simulated user pool, based on a correlation between a user feature of the simulated user and a user feature of the first user, and/or based on a correlation between the user feature of the simulated user and the request.

In one embodiment of the disclosure, the selecting the simulated user includes with respect to each simulated user in the simulated user pool respectively, determining a comprehensive correlation of the each simulated user relating to the first user and the request, based on a correlation between the each simulated user and the first user, and a correlation between the each simulated user and the request, and selecting the simulated user from the simulated user pool, based on the comprehensive correlation of the each simulated user in the simulated user pool relating to the first user and the request.

In one embodiment of the disclosure, the simulated user pool includes at least one of a simulated user pool corresponding to the first user, a simulated user pool corresponding to the content provider, and a simulated user pool corresponding to a current application.

In an embodiment of the disclosure, a simulated user in the simulated user pool is obtained by clustering a collected request for requesting a content provider to provide a content.

In an embodiment of the disclosure, the acquiring the simulated request corresponding to the selected simulated user according to the request includes taking the request as the simulated request corresponding to the selected simulated user, and/or generating the simulated request corresponding to the selected simulated user, according to the request and user property information of the selected simulated user.

In one embodiment of the disclosure, the method further includes generating a corresponding random simulated request respectively, with respect to each simulated user, and transmitting the random simulated request to the content provider.

In an embodiment of the disclosure, the transmitting, to the content provider, the simulated request corresponding to the selected simulated user includes transmitting, to the content provider, the corresponding simulated request, with user information of the selected simulated user corresponding to the content provider.

In an embodiment of the disclosure, the selected simulated user includes an anonymous simulated user.

In an embodiment of the disclosure, the selected simulated user includes a second user, and wherein the transmitting, to the content provider, the simulated request corresponding to the selected simulated user includes transmitting, to the content provider, the simulated request corresponding to the second user, through a user terminal of the second user.

In an embodiment of the disclosure, the method of requesting the content is executed by a user terminal of the first user or by a server apparatus, and wherein when the method of requesting the content is executed by the user terminal of the first user, the method further includes receiving, from the server apparatus, a content to be provided to the first user, which is determined by the server apparatus based on a content returned by the content provider in response to the simulated request.

In one embodiment of the disclosure, the method further includes receiving a content returned by the content provider in response to the simulated request, and determining a content to be provided to the first user, based on the received content.

In an embodiment of the disclosure, the determining the content to be provided to the first user includes selecting the content to be provided to the first user from the received content, based on a correlation between the simulated user corresponding to the simulated request and the first user, and/or based on a correlation between the simulated request and the request.

In an embodiment of the disclosure, the determining the content to be provided to the first user includes selecting the content to be provided to the first user from the received content, based on a correlation between a user feature of the simulated user corresponding to the simulated request and a user feature of the first user, and/or based on the correlation between the simulated request and the request.

In an embodiment of the disclosure, the determining the content to be provided to the first user includes with respect to the received content returned in response to each simulated request respectively, determining a comprehensive correlation of the content returned in response to the each simulated request relating to the first user and the request, based on a correlation between a simulated user corresponding to the each simulated request and the first user, and a correlation between the each simulated request and the request, and selecting, from the received content, the content to be provided to the first user, based on the comprehensive correlation of the received content returned in response to the each simulated request relating to the first user and the request.

In an embodiment of the disclosure, the selected simulated user includes a second user, wherein the receiving the content returned by the content provider in response to the simulated request includes acquiring a content returned by the content provider in response to the simulated request transmitted by a user terminal of the second user, through the user terminal of the second user.

In an embodiment of the disclosure, the method of requesting the content is executed by a user terminal of the first user or by a server apparatus, and wherein when the method of requesting the content is executed by the server apparatus, the method further includes transmitting, to the user terminal of the first user, the determined content to be provided to the first user.

In an embodiment of the disclosure, the user feature of the simulated user is a user feature obtained by performing user profiling based on a history request which corresponds to the simulated user and is used for requesting a content provider to provide a content. In an embodiment of the disclosure, the user feature of the first user is a user feature obtained by performing user profiling based on a history request which corresponds to the first user and is used for requesting a content provider to provide a content.

In an embodiment of the disclosure, when a current application is an electronic business application, the content which is requested to be provided by the content provider includes retrieved commodity information, and/or when a current application is an information retrieve application, the content which is requested to be provided by the content provider includes an information retrieve result, and/or when a current application is a multi-media content playing application, the content which is requested to be provided by the content provider includes retrieved multi-media content information.

In accordance with another aspect of the disclosure, an apparatus of providing a content is provided. The apparatus includes receiving a content returned by a content provider in response to a simulated request, and determining a content to be provided to a first user, based on the received content, wherein the simulated request corresponds to a request of the first user which is used to request the content provider to provide the content.

In an embodiment of the disclosure, a simulated user corresponding to the simulated request includes a second user, and wherein the receiving the content returned by the content provider in response to the simulated request includes acquiring, through a user terminal of the second user, a content returned by the content provider in response to the simulated request transmitted by the user terminal of the second user.

In an embodiment of the disclosure, the method of providing the content is executed by a user terminal of the first user or a server apparatus, and wherein when the method of providing the content is executed by the server apparatus, the method further includes transmitting, to the user terminal of the first user, the determined content to be provided to the first user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
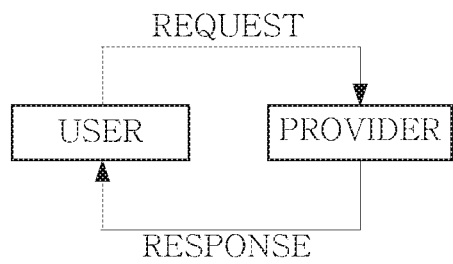
FIG. 1 illustrates an existing interaction procedure for a user to request a content provider to provide a content according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

In an embodiment of the disclosure, the terms, such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the disclosure, an electronic device may be a smartphone, tablet, personal digital assistant, media player, portable multimedia player, e-book reader; digital broadcast device, personal computer, laptop computer, micro server, navigation, music player, digital camera, mobile device, or image forming apparatus, but is not limited thereto.

In the related art, when a user searches a commodity or other information in a website or an application, much too similar information is obtained though the same search keyword, and even though the search keywords are different and information to be searched is different, the same search result may also be obtained. The reason may be that the user has searched the information or similar information many times recently, and a content provider overuses user profiling of the user, resulting in that the content pushed to the user is much too similar and unified, so that user may experience banality.

In addition, if the user is in urgent need of buying a commodity, and the content provider knows that the user is in urgent need of buying a certain commodity through a user profiling technique (for example, the user has brought a commodity relevant to the certain commodity), the content provider may improve price of the certain commodity or push a higher price commodity when the user is searching a commodity, and the user may find that purchasing price may be higher than normal price after finishing the purchase, which may harm the user experience.

The above example reflects that using the user profiling technique by the content provider brings worse user experience to the user. To a great extent those cases are caused by shortage of an existing technique, such as user profiling, and the like. However, the case where the content provider performs user profiling on the user is inevitable.

An interaction procedure for a user to request a content provider to provide a content in the related art is illustrated in FIG. 1.

FIG. 1 illustrates an existing interaction procedure for a user to request a content provider to provide a content according to an embodiment of the disclosure.

Referring to FIG. 1, a user directly initiates a request to a content provider with respect to a requirement of the user, and the content provider performs a series of operations, such as requirement analyzing, requirement parsing, and etc., and finally returns feedback content to the user.

The content provider may directly acquire a request of the user, and then on that basis quickly learns preference of the user. This kind of direct interaction may be referred to as direct user profiling, and the content provider can obtain direct acknowledgement of a preference of a certain user. Nowadays, the user profiling technique is widely used by the content provider. The content provider obtains a preference of a user by using this technique, and thereby provides an individualized customized service to the user. Over-profiling may result that contents pushed to the user are too much similar and unified, so that user may experience banality. Further, the user's benefit may be harmed, for example, if the content provider knows that the user is in urgent need of a certain commodity through the user profiling technique, the content provider may increase the price of the certain commodity for the user or push commodity having relatively higher price when the user searching the commodity. There may be a risk of violation of the user's privacy.

The user profiling technique used by the content provider may be imperfect, and has a possibility of under-user profiling and over-user profiling.

In the case of under-profiling, because the content provider has not built up accurate user profiles for users, it may be difficult for the content provider to provide the content to the user that satisfies the user request.

In the case of over-profiling, if the user has previously requested the content provider to acquire specific information unintentionally, for example, by clicking a link of that particular information, the user may receive results related to that information unintentionally clicked in response to his searches in the future.

In particular, responses of the content provider are all selected from a collection consisted of all possible responses, and a procedure of providing the user with a response through user profiling may be understood as a procedure of selecting an adequate response from the collection consisted of all possible responses according to a preference of the user.

In case of under-profiling, the content provider may hardly obtain accurate information of the user, so that the content provider may fail to provide a customized service by using the information. In the case of over-profiling, although the content providers may obtain relatively accurate information of the user, the information is used excessively, so that user may experience banality.

The content provided to the user by the content provider is selected by the content provider, and if the content provider continuously provides a similar type of information continuously in response to the user's request, which may make the user lose an opportunity of receiving another type of information.

If user profiles are traded between content providers, user privacy may be seriously violated.

Various embodiments of the disclosure provide a method of requesting a content and a corresponding apparatus, and a method of providing a content and a corresponding apparatus, and when a user requests a content provider to provide a content, privacy information of the user is protected, loss of the user caused by using the user profiling technique by the content provider is reduced, user experience is improved, and user's benefit is protected.

Figure 2:
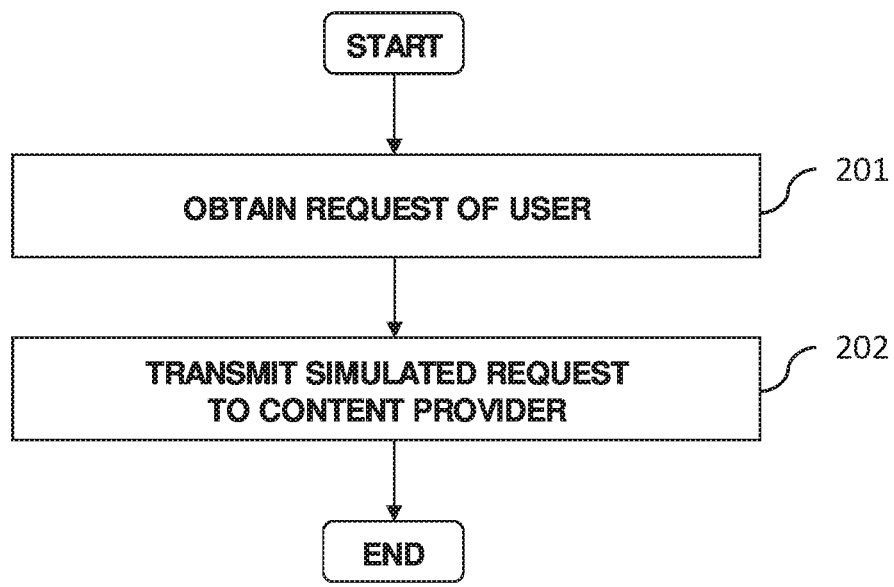
FIG. 2 illustrates a flowchart of a method of requesting a content according to an embodiment of the disclosure.

FIG. 2 illustrates a flowchart of a method of requesting a content according to an embodiment of the disclosure.

Referring to FIG. 2, the method may be executed by a user terminal, or may be executed by a server apparatus. As an example, the user terminal may be, but is not limited thereto, an electronic terminal, such as a mobile communication terminal (for example, a smart mobile phone), a smart wearable apparatus (for example, a smart watch), a personal computer, a panel, a game console, a digital multi-media player and etc. The server apparatus may be, but is not limited thereto, a remote server apparatus, such as a cloud server and etc.

The method may be implemented by a computer programmer. For example, the method may be implemented by an application installed in a user terminal, or may be implemented by a functional programmer in an operation system of a user terminal; or the method may also be implemented by a computer programmer stored in a server apparatus.

At operation 201, a request of a user may be obtained. The request of the user may be a request to request a content provider to provide a content.

The content provider may provide various kinds of data as well as contents, and may simply be referred to as a provider.

In the disclosure, a first user may refer to a user who inputs a request to a content provider. A second user may refer to a user included in a simulated user pool, that is, a user having an identity of a person. The second user may refer to a user who transmits a simulated request to the content provider for the first user but not input his request to the content provider. It should be understood that the first user and the second user are not intended for limitation, but rather to illustrate their role in various embodiments. For example, the second user may also input his request to a provider, and a simulated request corresponding to the request may be also transmitted to the provider via the first user. In the disclosure, the first user may be simply referred to as a user, and the second user may be referred to as another user.

In an embodiment of the disclosure, a content of the request may include a keyword of the content which is requested from the content provider by the first user.

As an example, when a current application is an electronic business application, the content requested to be provided by the content provider may include retrieved commodity information. When the current application is an information retrieve application, the content requested to be provided by the content provider may include an information retrieve result. When the current application is a multi-media content playing application, the content requested to be provided by the content provider may include retrieved multi-media content information.

Here, the current application is an application which is currently used by the first user and corresponds to the content provider. As an example, the first user may use an application corresponding to the content provider on the user terminal, or visit a website corresponding to the content provider to input his request to the content provider at operation 201.

Here, the first user is an actual user who uses the user terminal, for example, a natural person, or an individual or a group having a content requirement in a broad sense.

At operation 202, a simulated request corresponding to the request is transmitted to the content provider. In other words, the simulated request corresponding to the request is transmitted to the content provider instead of the request.

In an embodiment of the disclosure, the simulated request corresponding to the request is transmitted to the content provider through an identity of a simulated user.

In one embodiment of the disclosure, a simulated request may be transmitted by at least two simulated users. For example, a simulated request corresponding to each simulated user may be sent to the content provider via identity of each simulated user.

In an embodiment of the disclosure, there is a correlation between the simulated user and the first user. There is a correlation between the simulated user and the request.

As an example, there is a correlation between a user feature of the simulated user and a user feature of the first user, and the simulated user may be a non-anonymous simulated user.

In this example, there may be a positive correlation between a probability for a simulated user to transmit a simulated request, and a correlation between a user feature of the simulated user and the user feature of the first user. For example, the higher the correlation between the user features of the simulated user and the user features of the user, the higher the probability that the simulated request is transmitted to the provider through the corresponding simulated user.

In one embodiment of the disclosure, there may be a correlation between user features of the simulated user and the request of the user. In this example, there may be a positive correlation between a probability for a simulated user to transmit a simulated request, a correlation between the user feature of the simulated user and the request. For example, the higher the correlation between the user features of the simulated user and the request of the user, the higher the probability that the simulated request is transmitted to the provider by the identity of the corresponding simulated user.

In an embodiment of the disclosure, a type of a simulated user may include a non-anonymous simulated user and an anonymous simulated user. The non-anonymous simulated user may have user information (for example, account information) corresponding to a content provider, that is, the non-anonymous simulated user may have a registration identity (for example, the registration identity with which an application or a website corresponding to the content provider can be logged in) corresponding to the content provider; the anonymous simulated user does not have user information corresponding to the content provider, that is, the anonymous simulated user does not have a registration identity corresponding to the content provider, but only have a tourist identity (namely an anonymous visit identity) corresponding to the content provider. The non-anonymous simulated user may also be referred to as a pseudo user.

Here, user features of different simulated users may be different from each other.

Accordingly, a content provider may perform user profiling on the non-anonymous simulated user, but may not perform user profiling on the anonymous simulated user. For example, the non-anonymous simulated user may refer to a user on which user profiling is performed by the provider, and the anonymous simulated user may refer to a user on which user profiling is not performed by the provider.

The non-anonymous simulated user may be generated in various proper manners. For example, a non-anonymous simulated user may be obtained by clustering requests used to request content to a content provider. For example, different types of requests obtained by the clustering may correspond to simulated users.

In one embodiment of the disclosure, the non-anonymous simulated user may be obtained based on user profiles collected based on actual users. For example, user profiles of different users may correspond to different non-anonymous simulated users. The non-anonymous simulated user created in the above manner may be a simulated user built by the above method, rather than an actual user.

In one embodiment of the disclosure, an actual user may be treated as a non-anonymous simulated user. For example, an identity of a certain user registered with a certain content provider may be shared with another user, and the other user may use the identity of the certain user as an identity of a simulated user. For example, a user who plays a role as a simulated user for another user exists in the world, and may have and use a user terminal.

In an embodiment of the disclosure, if the simulated user includes the non-anonymous simulated user, then the simulated request corresponding to the request may be transmitted to the content provider with an identity of the non-anonymous simulated user. With respect to the non-anonymous simulated user, the simulated request corresponding to the non-anonymous simulated user may be transmitted to the content provider with the registration identity of the non-anonymous simulated user relating to the content provider (for example, an identity after logging in the content provider by using an account registered on the content provider). Because the content provider cannot distinguish a user from a simulated user, and cannot distinguish whether the current request is a request of the user or a simulated request, the content provider processes the received simulated request and respond thereto. For example, the simulated request may be treated as a request of an actual user by the content provider. The simulated user may be treated as an actual user by the content provider. In response to receiving the simulated request, the content provider may return a response in accordance with a user profile of the non-anonymous simulated user corresponding to the simulated request. For example, the provider may present, as a response, a content conforming to the preference of the non-anonymous simulated user represented by a user profile of the non-anonymous simulated user.

When the simulated user includes the anonymous simulated user, then the simulated request corresponding to the request may be transmitted to the content provider with the identity of the anonymous simulated user. For example, with respect to the anonymous simulated user, the simulated request corresponding to this anonymous simulated user may be transmitted to the content provider with a non-registration identity of this anonymous simulated user (for example, a guest identity without login). Since the simulated request is transmitted to the content provider with the non-registration identity (namely, in an anonymous manner), no user profiling can be based on by the content provider when the content provider returns the requested content in response to this simulated request.

Hereinafter, a method of transmitting, to the content provider, the simulated request corresponding to the request will be described in combination with FIG. 3.

Figure 3:
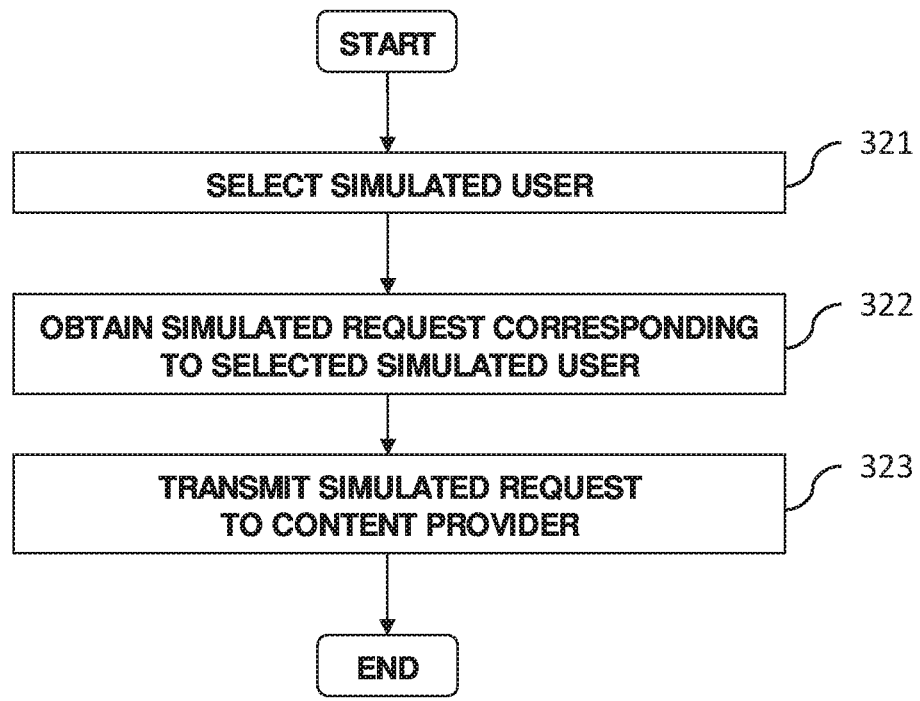
FIG. 3 illustrates a flowchart of a method of transmitting, to a content provider, a simulated request corresponding to a request according to an embodiment of the disclosure.

FIG. 3 illustrates a flowchart of a method of transmitting, to a content provider, a simulated request corresponding to a request according to an embodiment of the disclosure.

Referring to FIG. 3, at operation 321, a simulated user may be selected.

For example, one non-anonymous simulated user may be selected. For example, a plurality of (at least two) non-anonymous simulated users may be selected. For example, a plurality of non-anonymous simulated users and one anonymous simulated user may be selected. For example, one anonymous simulated user may be selected.

In an embodiment of the disclosure, the simulated user may be selected from the simulated user pool only based on the correlation between the simulated user and the first user. In an embodiment of the disclosure, the simulated user may be selected from the simulated user pool only based on the correlation between the simulated user and the request. In an embodiment of the disclosure, the simulated user may be selected from the simulated user pool based on the correlation between the simulated user and the first user and the correlation between the simulated user and the request. As an example, with respect to each simulated user in the simulated user pool respectively, a comprehensive correlation of the each simulated user relating to the first user and the request may be determined, based on a correlation between the each simulated user and the first user, and a correlation between the each simulated user and the request; and then the simulated user may be selected from the simulated user pool, based on the comprehensive correlation of the each simulated user in the simulated user pool relating to the first user and the request.

In an embodiment of the disclosure, the non-anonymous simulated user may have a user feature, and the anonymous simulated user may not have a user feature. As an example, the non-anonymous simulated user may be selected from the simulated user pool, based on a correlation between a user feature of the non-anonymous simulated user and a user feature of the first user, and a probability for a non-anonymous simulated user to be selected is positively relevant to a correlation between a user feature of the non-anonymous simulated user and the user feature of the first user. For example, as the correlation between user features of the simulated user and user features of the user increases, the probability that the simulated user is selected is also increase.

In one embodiment of the disclosure, a non-anonymous simulated user may be selected from the simulated user pool based on the correlation between user features of the non-anonymous simulated user and the request of the user.

In an embodiment of the disclosure, with respect to each non-anonymous simulated user in the simulated user pool respectively, a comprehensive correlation of the each non-anonymous simulated user relating to the first user and the request may be determined, based on a correlation between the each non-anonymous simulated user and the first user, and a correlation between the each non-anonymous simulated user and the request; and then the non-anonymous simulated user may be selected from the simulated user pool, based on the comprehensive correlation of the each non-anonymous simulated user in the simulated user pool relating to the first user and the request. Here, the higher a total correlation a non-anonymous simulated user has, the higher probability that the corresponding non-anonymous simulated user is selected.

As an example, the user feature of the first user may be a feature for indicating information of the first user, such as interest, preference, and etc. The user feature of the first user may be obtained in various proper manners. For example, preset individual information of the first user may be directly acquired as the user feature of the first user, or may be obtained via user-profiling. For example, user profiling may be performed based on a history of requests, a view history, etc., to obtain user features of a user by using a user label. User features of a non-anonymous simulated user may indicate interests, hobby, or preferences of the non-anonymous simulated user. The user features of the non-anonymous simulated user may be obtained by various appropriate manners. For example, the user features of the non-anonymous simulated user may be obtained by performing user profiling on the non-anonymous simulated user. The history of requests of the non-anonymous simulated user may include a history of simulated requests.

Figure 4:
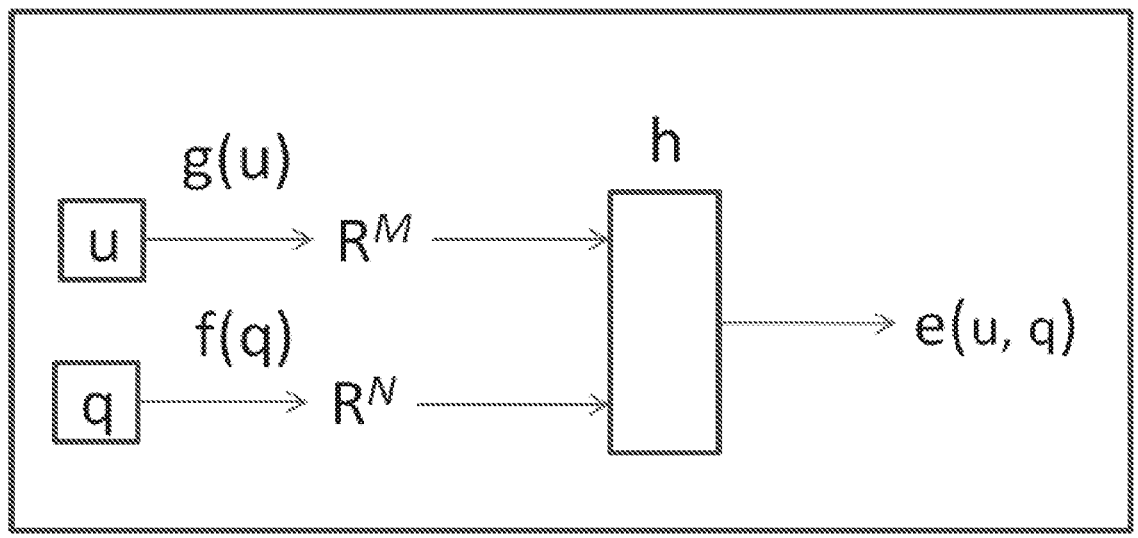
FIG. 4 illustrates a method of determining a correlation between a simulated user and a request according to an embodiment of the disclosure.

A method of determining correlation between a simulated user and a request is explained by referring to FIG. 4.

FIG. 4 illustrates a method of determining a correlation between a simulated user and a request of a user according to an embodiment of the disclosure.

Various proper manners may be used to determine the correlation between the user feature of the non-anonymous simulated user and the user feature of the first user, and the correlation between the user feature of the non-anonymous simulated user and the request. As an example, the correlation between the user feature of the non-anonymous simulated user and the user feature of the first user may be measured by calculating a similarity between them. The correlation between the user feature of the non-anonymous simulated user and the request of the user may be measured by calculating a similarity between them. For example, a user module may be user to evaluate in what extent the simulated user is relevant to the request.

Referring to FIG. 4, u represents a certain non-anonymous simulated user; q represents the request; if a pair of non-anonymous simulated user and request (u, q) is given, the correlation between the non-anonymous simulated user u and the request q may be calculated through the user model, that is, how does a certain non-anonymous simulated user "like" the request may be calculated through the user model. A user feature of the non-anonymous simulated user u may be mapped to M-dimensional vector $g(u) \in R^M$. For example, the vector $g(u)$ may represent a preference of the non-anonymous simulated user u. Contents of the request q is mapped to a N-dimensional vector $f(q) \in R^N$ (for example, firstly semantic feature extraction may be performed on the content of the request, and secondly the extracted semantic feature is mapped to a N-dimensional vector), and then these two vectors may be taken as a new (M+N)-dimensional vector and input into an energy calculator (for example, h(g,f) in FIG. 4). The energy calculator may output a value e(u,q) for measuring the correlation thereof, and it may be considered as an energy value based on the simulated user and the request. For example, a distance (for example, a cosine distance, a Mahalanobis distance, and etc.) between g(u) and f(q), which is obtained through calculation, may be taken as a measurement of the similarity between the user feature of the non-anonymous simulated user and the request of the user.

In addition, as an example, the correlation between the user feature of the non-anonymous simulated user and the user feature of the first user, and the correlation between the user feature of the non-anonymous simulated user and the request may be determined through a machine learning technique (for example, deep learning, shallow learning, and etc.). For example, the two of the user feature of the non-anonymous simulated user and the user feature of the first user may be taken as an input of a pre-trained machine learning model (for example, a neural network model, a support vector machine model, and etc.), and a value for measuring a correlation between them is output through the machine learning model.

Various algorithms may be used to calculate the correlation between a simulated user and a user, or between a simulated user and a user's request, in addition to the above method.

Various proper manners may be used to determine a comprehensive correlation of the simulated user relating to the first user and the request of the user, based on the correlation between the simulated user and the first user and the correlation between the simulated user and the request. As an example, with respect to one simulated user, a first energy value for measuring the correlation between the simulated user and the first user, and a second energy value for measuring the correlation between the simulated user and the request of the user may be determined. Then a comprehensive energy value for measuring the comprehensive correlation of the simulated user relating to the first user and the request may be determined based on the first energy value and the second energy value. For example, the comprehensive energy value may be obtained through linear superposition or non-linear superposition of the first energy value and the second energy value; or the first energy value and the second energy value are taken as an input of a previously trained machine learning model, and a corresponding comprehensive energy value may be output through the machine learning model.

As an example, non-anonymous simulated users in a simulated user pool may be sorted in accordance with high and low of the correlation between the non-anonymous simulated user and the first user. The non-anonymous simulated users in the simulated user pool may be sorted in accordance with high and low of the correlation between the non-anonymous simulated user and the request of the user. The non-anonymous simulated users in the simulated user pool may be sorted in accordance with high and low of the comprehensive correlation of the non-anonymous simulated users relating to the first user and the request of the user. Further, a first predetermined number of the sorted non-anonymous simulated users may be selected. Here, the first predetermined number may be determined based on a factor, such as a network bandwidth, access restriction of the content provider, a number of a returned result expected to be received by the first user. As another example, a non-anonymous simulated user in the simulated user pool, of which the correlation with the first user and/or the correlation with the request meets a corresponding preset condition, may be selected. For example, a non-anonymous user in the simulated user pool, of which the comprehensive correlation relating to the first user and the request is higher than a first preset threshold value, may be selected.

In an embodiment of the disclosure, the simulated user pool for selecting the simulated user may include at least one of a simulated user pool corresponding to the first user, a simulated user pool corresponding to the content provider, and a simulated user pool corresponding to a current application. As an example, a corresponding simulated user pool may be set with respect to each content provider, that is, a content provider corresponds to a simulated user pool one by one. As another example, a corresponding simulated user pool may be set with respect to a plurality of content providers (for example, a plurality of content providers of which types are identical or similar), that is, the plurality of content providers share one simulated user pool. As another example, a corresponding simulated user pool may be set with respect to each user, that is, a user corresponds to a simulated user pool one by one. As another example, a corresponding simulated user pool may be set with respect to a plurality of users, that is, the plurality of users share one simulated user pool.

A simulated user pool includes a plurality of non-anonymous simulated users, wherein features of different non-anonymous simulated users are different. For example, at least a part of user features of different non-anonymous simulated user are different. The simulated user pool may be generated in various proper manners. As an example, the simulated user pool may be generated in the following manner firstly, acquiring a plurality of history requests for requesting a content provider to provide a content; secondly, clustering the plurality of history requests in accordance with semantic, and taking a set of history request included in each class obtained through the clustering as each non-anonymous simulated user in the simulated user pool respectively, wherein each class corresponds to the each non-anonymous simulated user one by one. Here, each class may have one-to-one correspondence with non-anonymous simulated users. For example, a simulated user identifier (for example, a user name, a user ID, and etc.) may be allocated to the set of history request included in the each class obtained through clustering, so as to generate one non-anonymous user. As an example, when the simulated user pool to be generated has one-to-one correspondence with a content provider, the simulated user pool may be generated based on a history of requests for requesting the content provider to provide a content. In addition, the simulated user pool may be generated based on a history of requests for requesting another content provider to provide a content. Each non-anonymous simulated user generated in the above manner corresponds to a set of history request included in one class, and thus user profiling may be performed based on the set, to obtain an initial user feature of the non-anonymous simulated user. Each non-anonymous simulated user generated in the above manner has an explicit and typical feature, and there is a distinct boundary between the non-anonymous simulated users. In this way, various user profiling algorithms can be used to perform accurate user profiling on the non-anonymous simulated user, so that good user profiling performed by the content provider on the non-anonymous simulated user can be protected, resulting in that the content provider can return personalized and targeted content with respect to a request of the non-anonymous simulated user.

Referring back to FIG. 3, at operation 322, a simulated request corresponding to the selected simulated user may be obtained.

In an embodiment of the disclosure, the simulated request corresponding to the request may be generated with respect to each selected simulated user. Here, contents of the simulated request may be identical to or similar with the request of the user. As an example, in the case where an original meaning of the request is kept unchanged, slight change may be made on the request (for example, changing an expression manner, and etc.) to generate the simulated request, or a generic concept or a subordinate concept of the request may be taken as the simulated request. For example, when the request is a "flash memory", the subordinate concept "U-disk" and etc. may be taken as the simulated request, but one with a substantial difference from the "flash memory," such as a "data line" and etc., may not be taken as the simulated request.

In an embodiment of the disclosure, the request of the user may be directly taken as the simulated request corresponding to the selected simulated user. For example, when the simulated user is selected, the user's request may be transmitted to the provider with the identity of the simulated user. Here, the selected simulated user may be an anonymous simulated user. Because the content provider cannot perform user profiling on the anonymous simulated user based on the simulated request of the anonymous simulated user, the request of the user may be directly taken as the simulated request corresponding to the anonymous simulated user.

In an embodiment of the disclosure, one simulated user may correspond to one or more simulated requests.

In an embodiment of the disclosure, the simulate request corresponding to the selected simulated user may be generated according to the request and user property information of the selected simulated user. For example, the content of the request may be adjusted based on the user property information of the simulated user, to generate a simulated request taken as the simulated request corresponding to the simulated user, wherein the similarity between the semantic of the simulated request and the semantic of the request meets a certain condition. Here, user property information of the simulated user is information capable of representing an individual characteristic of the simulated user, for example, the user property information of the simulated user may include information, such as a nationality, a gender, an age, a commonly used expression manner. As an example, the user property information of the simulated user may be preset. In an embodiment of the disclosure, the user property information of the simulated user may be acquired based on the user feature of the simulated user.

As an example, in the case where the non-anonymous simulated user in the simulated user pool is obtained by clustering the history of requests for requesting the content provider to provide the content, when generating the simulated request corresponding to the request with respect to the non-anonymous simulated user selected from the simulated user pool, a history of requests may be selected and taken as the simulated request, from among a set of histories of requests corresponding to the selected non-anonymous simulated user. Here, the similarity between the selected history request and the request may meet a certain condition.

In one embodiment of the disclosure, the simulated request corresponding to the selected simulated user may be sent to the content provider instead of the user's request. For example, at operation 323, the simulated request may be transmitted to the content provider using user information of the selected simulated user. In other words, the simulated request may be transmitted to the provider using identifier of the simulated user registered with the provider. In particular, as an example, from among the selected simulated user, a simulated request corresponding to a non-anonymous simulated user is transmitted to the content provider using a registration identity of the non-anonymous simulated user registered with the content provider (for example, an identity after logging in the content provider by using an account registered on the content provider). Because the content provider cannot distinguish a user from a simulated user, and cannot distinguish whether the current request is a request of the user or a simulated request, the content provider processes the received simulated request and respond thereto. For example, the simulated request may be treated as a request of an actual user by the content provider. The simulated user may be treated as an actual user by the content provider. In response to receiving the simulated request, the content provider may return a response in accordance with a user profile of the non-anonymous simulated user corresponding to the simulated request.

It should be understood that, registration identities of different non-anonymous simulated users with respect to the same content provider are different, that is, login accounts of different non-anonymous simulated users corresponding to the same content provider are different. As an example, with respect to each anonymous simulated user from the selected simulated user, the simulated request corresponding to the anonymous simulated user is transmitted to the content provider, with the non-registration identity of the anonymous simulated user with respect to the content provider (for example, a non-registration identity with which no registered account is used to log in the content provider); since the simulated request is transmitted to the content provider with the non-registration identity (namely, in an anonymous manner), no user profiling is based on, when the content provider returns the requested content in response to the simulated request.

In the above embodiment of the disclosure, when transmitting the simulated request to the content provider, some additional information may be transmitted together, for example, the additional information may include information making the content provider identify the first user, such as Internet Protocol (IP) address of the user terminal used by the first user, and etc. Such additional information may be modified and transmitted to the content provider. For example, an actual IP address of the user terminal of the first user in the additional information, which needs to be transmitted along with the simulated request, is modified to an IP address different from the actual IP address, so that the content provider cannot identify that all these simulated requests are from the user of the same user terminal, so as to prohibit the content provider from obtaining the user information of the user based on these simulated requests.

As an example, when the selected simulated user includes another user (a second user) taken as the non-anonymous simulated user, the simulated request corresponding to the second user may be transmitted to the content provider through a user terminal of the second user. In particular, the simulated request corresponding to the second user may be transmitted to the user terminal of the second user, to transmit the received simulated request to the content provider by using the user information corresponding to the content provider by the user terminal of the second user.

Figure 5:
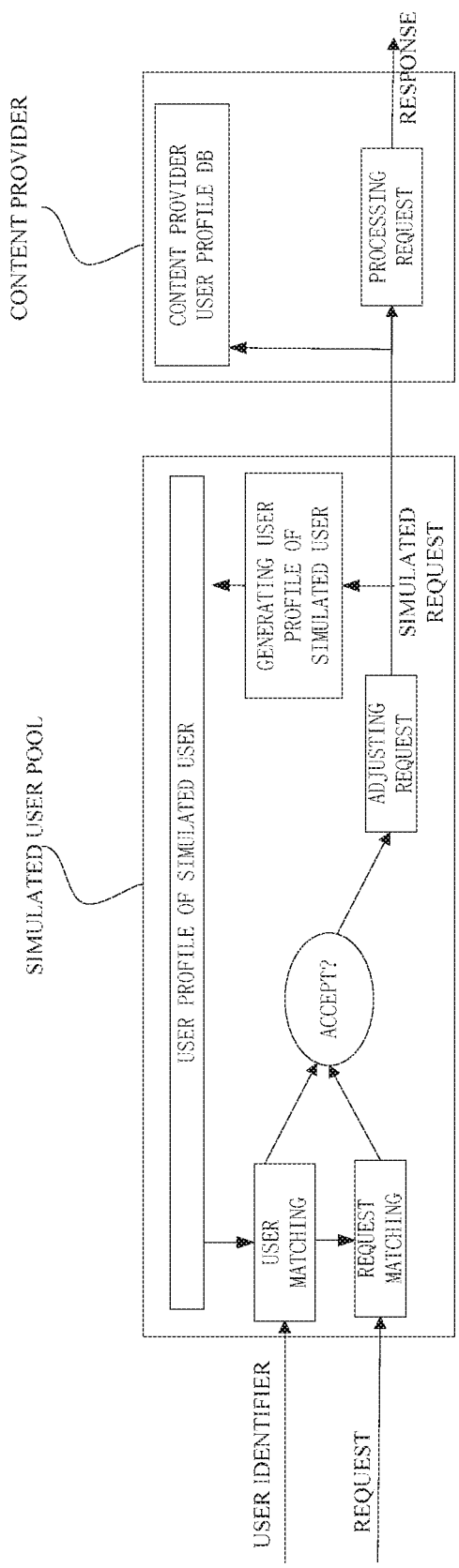
FIG. 5 illustrates a method of transmitting, to a content provider, a simulated request corresponding to a request according to an embodiment of the disclosure.

FIG. 5 illustrates a method of transmitting, to a content provider, a simulated request corresponding to a request according to an embodiment of the disclosure.

Referring to FIG. 5, a user's request may be transmitted to a particular simulated user pool using a user ID. The user ID may be used to match a user profile of a simulated user with the user and/or the user's request. If the matching is successful, then the request is accepted by the matched simulated user, and content of the request may be slightly modified to generate a simulated request of the matched simulated user. The generated simulated request is transmitted to the content provider (that is, the request is delivered to the content provider in a manner of the simulated request). When the simulated request is used, a user profile of a simulated user corresponding to the used simulated request may be updated. For example, the content provider processes the simulated request, makes a response, and uses the simulated request to improve user profiling of the simulated user.

In an embodiment of the disclosure, even though a request of a user for requesting a content provider to provide a content is not received, a corresponding random simulated request may also be generated with respect to each non-anonymous simulated user, and the random simulated request may be transmitted to the content provider. For example, a random simulated request that may represent and enhance a user feature of a non-anonymous mock user may be randomly generated aperiodically or periodically. For example, a random simulated request may be generated based on a user profile of a non-anonymous simulated user. The generated random simulated request may be transmitted to the content provider with the identity of the non-anonymous mock user so as to further refine the user profile of the non-anonymous mock user at a side of the content provider. For example, for a certain reason, when user profiling on a certain non-anonymous simulated user made by the content provider is somewhat biased, a random simulated request generated may be transmitted to the content provider with the identity of the non-anonymous simulated user, which may make the content provider update the user profile of the non-anonymous simulated user based on the random simulated request and may reduce the bias of the user profile of the non-anonymous simulated user.

In one embodiment of the disclosure, a user profile of a non-anonymous simulated user may be updated based on the random simulated request generated for the non-anonymous mock user. The update may be performed by a simulated user pool.

Figure 6:
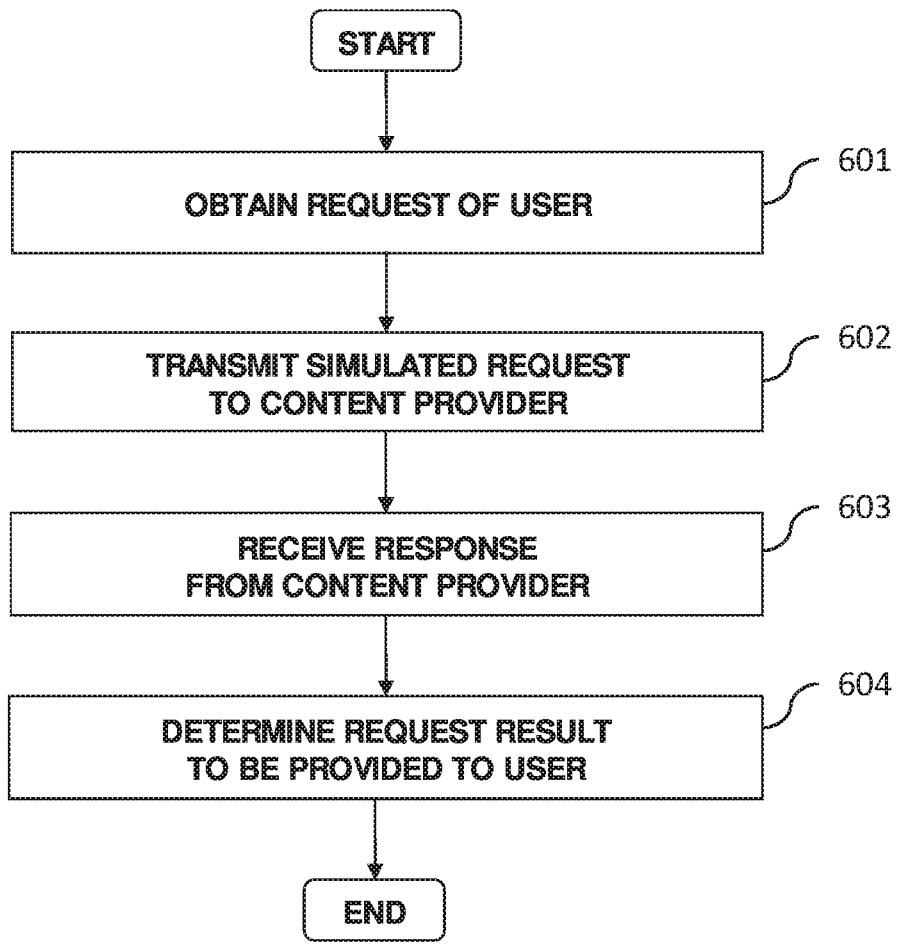
FIG. 6 illustrates a flowchart of a method of requesting a content according to an embodiment of the disclosure.

FIG. 6 illustrates a flowchart of a method of requesting a content according to an embodiment of the disclosure.

Referring to FIG. 6, the method of requesting the content according to an embodiment of the disclosure further includes operations 603 and 604, in addition to operations 601 and 602 which correspond to operations 201 and 202 illustrated in FIG. 2. Operations 601 and 602 may be implemented by referring to methods described according to FIGS. 2 to 5, explanation thereof not be repeated. Here, the method may be executed by a user terminal, or may be executed by a service apparatus.

At operation 603, a response returned by the content provider in response to the simulated request may be received.

In one embodiment of the disclosure, the response returned by the provider may include a content.

When a selected simulated user includes a second user taken as a non-anonymous simulated user, the response returned by the content provider in response to the simulated request which is transmitted by a user terminal of the second user may be acquired through the user terminal of the second user.

In an embodiment of the disclosure, a plurality of non-anonymous simulated users may be selected. In one embodiment of the disclosure, a plurality of non-anonymous simulated users and one anonymous simulated user may be selected such that a simulated request corresponding to the user's request may be generated for the anonymous simulated user, and transmitted to the content provider with an unregistered identity of the anonymous simulated user.

If the content provider allows anonymous visit, the content returned by the content provider in response to the simulated request corresponding to the anonymous simulated user may be received. If the content provider does not allow the anonymous visit, then the content returned by the content provider in response to the simulated request corresponding to the anonymous simulated user may not be received. In an embodiment of the disclosure, whether the content provider allows the anonymous visit may be determined first before transmitting a simulated request to the content provider. When it is determined that the content provider allows the anonymous visit, then a plurality of non-anonymous simulated users and one anonymous simulated user may be selected. When it is determined that the content provider does not allows the anonymous visit, then only a plurality of non-anonymous simulated users may be selected. It should be understood that, whether the content provider allows the anonymous visit may be determined in various proper manners, for example, by detecting whether a user interface corresponding to the content provider has a search block.

At operation 604, a request result to be provided to the user may be determined. The request result to be provided to the user may be determined from a response of the provider to the simulated request.

When at least two simulated requests are sent to the provider, the request result determined from the responses received from the provider may meet the following condition: there is a correlation between the corresponding simulated user and the first user, or there is a correlation between the corresponding simulated request and the request.

The correlation between the simulated request and the request of the user may be calculated by using a query model. For example, a higher energy value may be given to a simulated request having to a higher correlation with the request of the user. The correlation between the simulated user and the user may be calculated by using a user model. For example, a higher energy value may be given to a simulated user having a higher correlation with the user.

There is a correlation between user features of a simulated user corresponding to the determined request result and user features of the user. There is a correlation between a simulated request corresponding to the determined request result and the request of the user. A probability for a response received from the provider to be determined as the request result to be provided to the first user or to be included in the request result is positively relevant to correlation between the user feature of a simulated user corresponding to the response and user feature of the first user, or correlation between the simulated request corresponding to the response and the request of the user. For example, the higher the correlation between the user feature of the simulated user corresponding to the received content and the user feature of the first user is, and/or the higher the correlation between the simulated request corresponding to the received content and the request is, the higher the probability for the response to be determined as the content to be provided to the first user is.

The response received from the provider may include contents that the provider returned in response to the user's request. The request result to be provided to the user may include contents determined from the returned contents based on a certain criterion.

The content to be provided to the first user may be selected from the received content, based on the correlation between the simulated user corresponding to the simulated request and the first user, and/or the correlation between the simulated request and the request. The content to be provided to the first user may be selected from the received content, only based on the correlation between the simulated user corresponding to the simulated request and the first user. The content to be provided to the first user may be selected from the received content, only based on the correlation between the simulated request and the request. The content to be provided to the first user may be selected from the received content, based on both the correlation between the simulated user corresponding to the simulated request and the first user and the correlation between the simulated request and the request. For example, with respect to the received content returned in response to each simulated request respectively, determining a comprehensive correlation of the content returned in response to the each simulated request relating to the first user and the request, based on a correlation between a simulated user corresponding to the each simulated request and the first user, and a correlation between the each simulated request and the request. The content to be provided to the first user may be selected from the received content based on the comprehensive correlation of the received content returned in response to the each simulated request relating to the first user and the request.

In one embodiment of the disclosure, a subject compared with the user or user's request may be a simulated user. In one embodiment of the disclosure, a subject compared with the user or user's request may be a simulated request of a simulated user.

In one embodiment of the disclosure, when computing the correlation between a user or user's request, and a simulated user, user features of the simulated user may be used for the calculation.

The correlation between the user feature of the non-anonymous simulated user and the user feature of the first user, and the correlation between the simulated request and the request may be determined in various proper manners. As an example, with respect to the correlation between the user feature of the non-anonymous simulated user corresponding to the simulated request and the user feature of the first user, it may be measured through a similarity between them. Accordingly, with respected the correlation between the simulated request and the request, it may be measured through a similarity between them. For example, with respect to the content returned in response to each simulated request, a first energy value for measuring the similarity between the user feature of the non-anonymous simulated user corresponding to the returned content (namely the non-anonymous simulated user corresponding to the simulated request) and the user feature of the first user may be determined. The higher the similarity is, the higher the first energy value is. A third energy value for measuring the correlation between the simulated request corresponding to the returned content and the request may be determined. The higher the similarity is, the higher the third energy value is. With respect to the content returned in response to the simulated request, whether the returned content is selected to be provided to the first user based on the first energy value and/or the third energy value of the returned content, wherein the higher the first energy value or the third energy value is, the higher the probability for the returned content to be selected to be provided to the first user. A comprehensive energy value for the returned content may be determined based on both the first energy value and the third energy value of the content returned in response to the simulated request. For example, the comprehensive energy value may be obtained through linear or non-linear superposition of the first energy value and the third energy value; or the first energy value and the third energy value are taken as an input of a previously trained machine learning model, and the corresponding comprehensive energy value is output through the machine learning model.

As an example, if the same content is returned with respect to different simulated requests (namely, the simulated requests respectively corresponding to different simulated users), then a final energy value of the returned identical content may be determined based on the comprehensive energy value of the returned content corresponding to each simulated request from among the different simulated requests, that is, these returned identical contents may only be taken one returned content, but the corresponding final energy value thereof will be determined based on the comprehensive energy value of the returned content corresponding to these different simulated requests. For example, an U norm may be used to calculate the final energy value of the returned identical content. When n identical contents are returned with respect to n simulated requests, and the comprehensive energy values corresponding to these n contents successively are $S_1, S_2, S_1, \ldots, S_n$, then the final energy value obtained based on the comprehensive energy value of the n returned identical contents is $L^p=(S_1^p+S_2^p+S_3^p+\ldots+S_n^p)^{1/p}$, wherein p is a coefficient of the norm, so that the n returned contents are taken as one returned content, and are given a statistic final energy value, and the final energy value obtained through the norm processing may be compared with another comprehensive energy value of a returned normal content probably after undergoing a processing in another manner. In addition, the final energy value obtained through calculation may also be stored, so that when confronting a similar case, the final energy value may be fetched for use, to reduce operations.

As an example, with respect to the returned content corresponding to the simulated request of the anonymous simulated user, one third energy value may be determined only based on the correlation between the simulated request and the request, but a weight value with respect to the third energy value of the returned content corresponding to the simulated request of the anonymous simulated user may be set to be different from a weight value with respect to the third energy value of the returned content corresponding to the simulated request of the non-anonymous simulated user, the corresponding final energy value may be calculated based on the third energy value of the returned content corresponding to the simulated request of the anonymous simulated user and the corresponding weight value and then may be compared with the comprehensive energy value of the other normal returned content.

In one embodiment of the disclosure, a simulated request may be sent to the provider via an anonymous simulated user and a plurality of non-anonymous simulated users. A request result to be provided to the user may be generated based on individualized response (namely customized contents) provided by the content provider with respect to the non-anonymous simulated users, and a non-individualized and universal response (namely non-customized contents) provided by the content provider with respect to the anonymous simulated user, so that the user may obtain information without providing his personal information to the provider.

As an example, the returned responses may be sorted in accordance with high and low of the comprehensive energy value of the response to the simulated requests, and a top second predetermined number of sorted returned contents may be selected to be provided to the first user. Here, the second predetermined number may be determined based on a factor, such as a number preset by the first user, an accustomed browsing number of the first user (for example, the first user customarily browses top 100 recommendation results each time), a size of a screen of the user terminal used by the first user. As another example, the returned response of which the comprehensive energy value is higher than a second preset threshold value may be selected to be provided to the first user.

As an example, based on responses to be provided to the first user as a request result, or responses not to be provided to the first user, relevant information may be stored for following use.

Figure 7:
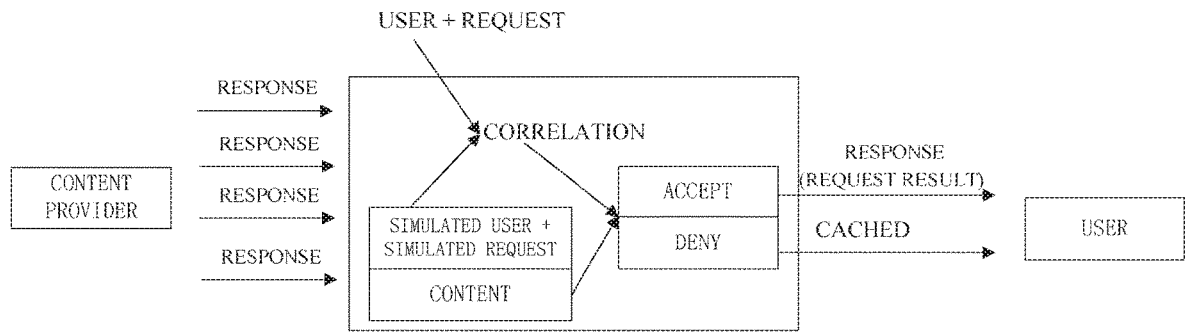
FIG. 7 illustrates a method of determining a content to be provided to the first user according to an embodiment of the disclosure.

FIG. 7 illustrates a method of determining a content to be provided to the first user according to an embodiment of the disclosure.

Referring to FIG. 7, when receiving a response returned by the content provider in response to each simulated request, it may be determined whether to provide the response to the user. For example, a correlation between a simulated user corresponding to a simulated request and a user may be determined to give a higher first energy value to a response showing higher correlation. For example, the correlation between the simulated request and the user's request may be determined to give a higher third energy value to a response showing higher correlation. Based on the first energy value and the third energy value of the returned response, it can be determined whether to provide the returned response the user. When it is determined not to provide a returned response to the first user, then the returned response may be cached, in order to prepare for being found and utilized conveniently at the time of a next request or in a similar situation.

In general, a content provider uses the user profiling technique to generate different request results with respect to different users. These request results are usually customized with respect to the preference of the user itself, or the request results is beneficial to benefit acquisition of the content provider. Since different simulated users themselves have different characteristics, although sometimes contents of simulated requests of different simulated users are completely consistent or roughly the same, the returned contents are usually different. Because a user may have many simulated users (including the anonymous simulated user), the number of the returned contents is usually huge, and it is obvious that it is unadvisable to push all the contents to the user. Therefore, in the embodiment of the disclosure, the returned responses may be screened to determine a content to be provided to the first user.

When the method of requesting the content according to an embodiment of the disclosure is executed by a service apparatus, the request result to be provided to the first user may be transmitted to a user terminal of the user.

At the side of the content provider, after the content provider receives the simulated request of the non-anonymous simulated user, in addition to returning a response to the simulated request, the content provider may continue to update a user profile of the non-anonymous simulated user based on the simulated request. In one embodiment of the disclosure, a user profile of a non-anonymous simulated user may be updated based on the simulated request generated for the non-anonymous mock user. The update may be performed by a simulated user pool or a device managing the simulated user pool. Various method may be used to guarantee consistency of a user profile of a non-anonymous simulated user at a provider and a simulated user pool. During a procedure of executing the method of requesting the content with respect to a certain user, before completing calculation of the correlation based on the non-anonymous simulated user, a user profile of the non-anonymous simulated user may be kept unchanged. For example, when a non-anonymous simulated user in the simulated user pool is not used, the user profile of the non-anonymous simulated user may be updated based on a simulated request corresponding to the non-anonymous simulated user in a period of time from a time point at which the user profile of the non-anonymous simulated user is updated previously to a current time point. If a user desires to use a non-anonymous simulated user which is currently used by another user, it may be implemented such that the user waits for completing the use of the non-anonymous simulated user by the other user (namely, until calculation of the correlation based on the non-anonymous simulated user is completed). In order to save waiting time or avoid inconsistency of a user profile of a simulated user, following methods may be used: enlarging a scale of the simulated user pool, confining a number of the users sharing the same simulated user pool, giving a lower weight value to the non-anonymous simulated user used currently by a user, etc. Therefore, while a non-anonymous simulated user is used by a first user, the non-anonymous simulated user may hardly or may not be selected by a second user.

Figure 8:
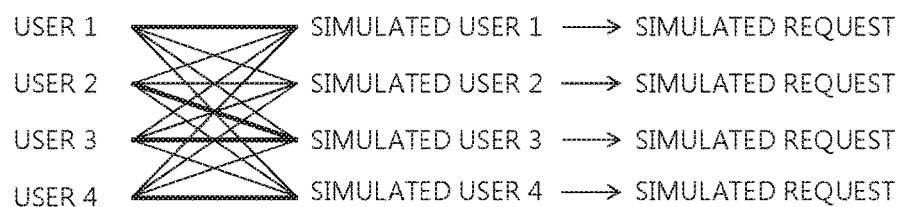
FIG. 8 illustrates a method of sharing one simulated user pool by a plurality of users according to an embodiment of the disclosure.

FIG. 8 illustrates a method of sharing one simulated user pool by a plurality of users according to an embodiment of the disclosure of the disclosure.

Referring to FIG. 8, there are the following advantages for a plurality of users to share one simulated user pool: first, it can prevent registration accounts of the non-anonymous simulated users from being flooded, and prevent the content provider from receiving simulated requests of which the number exceeds a tolerance range of the content provider; second, it can more frequently use the identity of the non-anonymous simulated user to transmit the simulated request to the content provider, so that the content provider performs accurate user profiling with respect to the non-anonymous simulated user; third, it can prevent the user profiling of the non-anonymous simulated user from more and more tending to a certain user, and in particular, if one simulated user pool only corresponds to one user, then along with transmitting, to the content provider, the simulated request identical or similar to the request of the user, with the registration identity of the non-anonymous simulated user in the simulated user pool, the user profiling of the non-anonymous simulated user in the simulated user pool will more and more tend to the user profiling of the user (or a certain under-fitted version of the user profiling), and the content provider may learn a part of user features of the user through similar behaviors of a plurality of non-anonymous simulated users in the simulated user pool; however, sharing one simulated user pool by a plurality of users, it can make the simulated requests transmitting by the non-anonymous simulated users in the simulated user pool to the content provider more diverse, so that the non-anonymous simulated users in the simulated user pool may not tend to a certain user, so as to protect individual information of the user.

Figure 9:
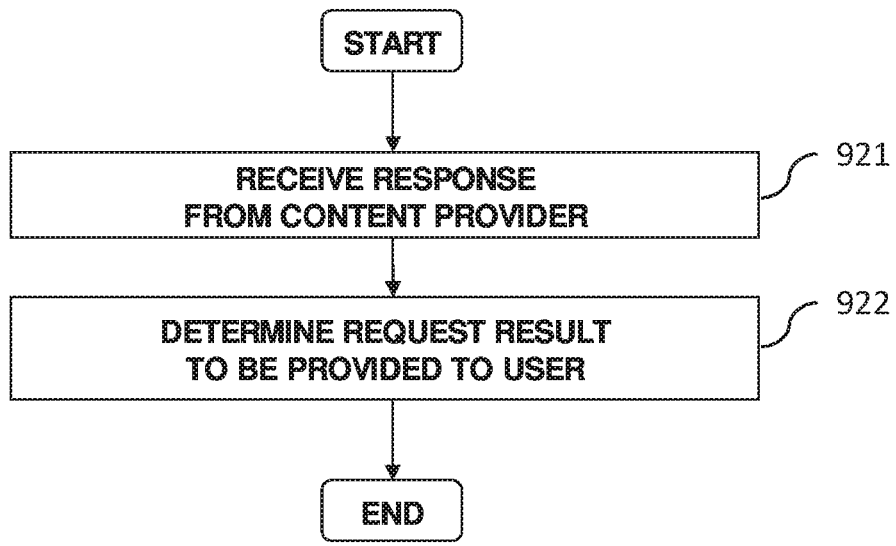
FIG. 9 illustrates a flowchart of a method of providing a content according to an embodiment of the disclosure.

FIG. 9 illustrates a flowchart of a method of providing a content according to an embodiment of the disclosure. Here, the method may be executed by a user terminal, or may be executed by a server apparatus.

Referring to FIG. 9, at operation 921, a response returned by the content provider in response to the simulated request may be received.

In an embodiment of the disclosure, when a simulated user corresponding to a simulated request includes another user (a second user), a response returned by the content provider in response to the simulated request which is transmitted by a user terminal of the second user may be acquired through the user terminal of the second user.

At operation 922, a request result to be provided to the user may be determined based on the received response. Operations 921 and 922 may be implemented with reference to the methods described above, and explanation thereof is not repeated.

When the method of providing the content according to the embodiment of the disclosure is executed by the server apparatus, the method may further include: transmitting, to the user terminal of the first user, the determined content to be provided to the first user.

Figure 10:
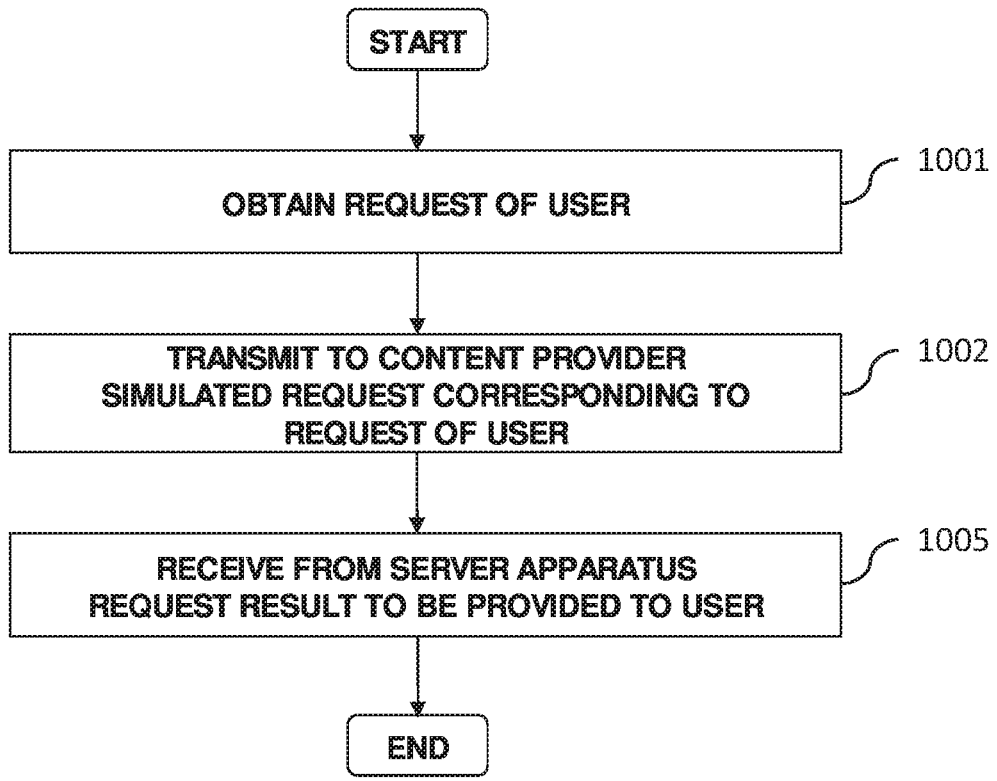
FIG. 10 illustrates a flowchart of a method of requesting a content according to an embodiment of the disclosure.

FIG. 10 illustrates a flowchart of a method of requesting a content according to an embodiment of the disclosure.

Referring to FIG. 9, operations 1001 and 1002 may be implemented with reference to the methods described above, and explanation thereof is not repeated.

Here, the method may be executed by a user terminal.

At operation 1005, a request result which is determined by the server apparatus based on a response returned by the content provider in response to the simulated request, may be received from the server apparatus.

FIGS. 11, 12, 13, 14, 15, 16, 17, 18, and 19 illustrate methods of providing a content according to various embodiments of the disclosure.

Figure 11:
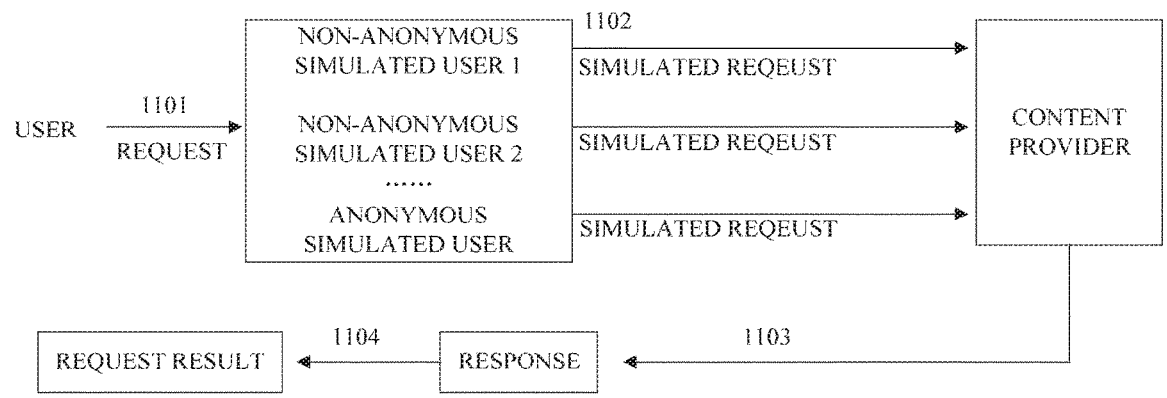
FIGS. 11, 12, 13, 14, 15, 16, 17, 18, and 19 illustrate methods of providing a content according to various embodiments of the disclosure.

Referring to FIG. 11, at operation 1101, a request of a user which is input for a provider may be obtained. The request of the user may be a request to request a content provider to provide a content. At operation 1102, a simulated request corresponding to the user's request may be sent to the content provider using an identity of a simulated user, and the simulated user may include a plurality of non-anonymous simulated users and an anonymous simulated user. At operation 1103, a response returned by the content provider in response to the simulated request may be received. At operation 1104, a request result to be provided to the user may be determined based on the received response.

In the embodiment of the disclosure, selecting the simulated user and generating the simulated request may be performed by a simulator, and the simulator may be directly installed in the user terminal or be installed in the server apparatus, to be provided to the user as an online service.

Determining a content as the request result to be provided to the user from a response returned by the provider may be performed by a filter. The filter may be installed in the user terminal or the server apparatus to be provided to the user as an online service The above simulator and filter may be deployed separately, for example, the simulator is deployed in the user terminal and the filter is deployed in the server apparatus, or the simulator is deployed in the server apparatus and the filter is deployed in the user terminal. A request of a user to a provider may be obtained in a user terminal of the user, and a request result may be displayed on the user terminal. The request result displayed on the user terminal may include a content selected based on a response of the provider to a simulated request.

Figure 12:
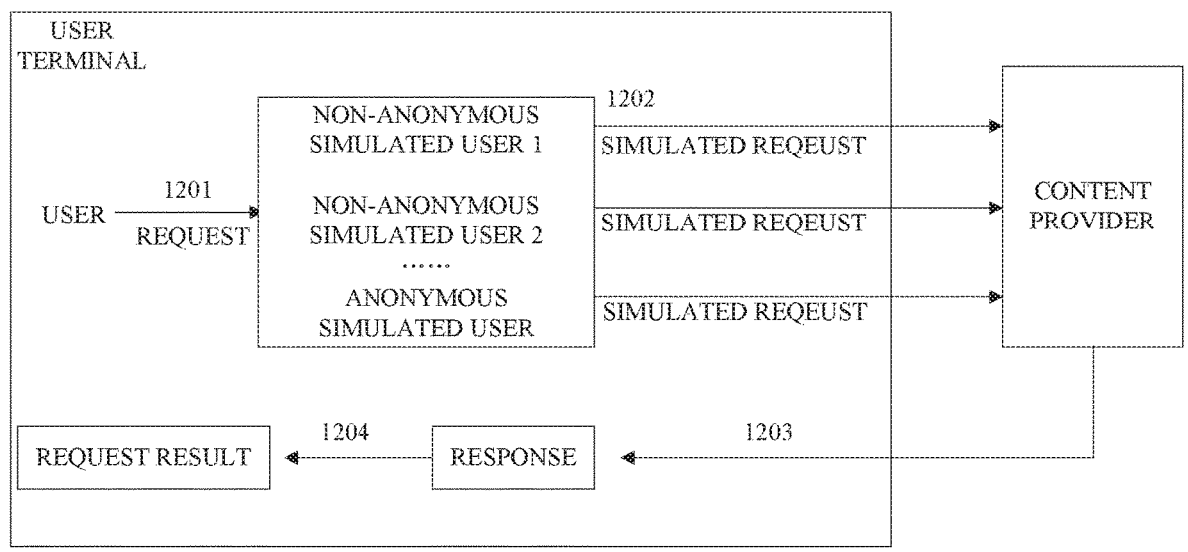
Figure 13:
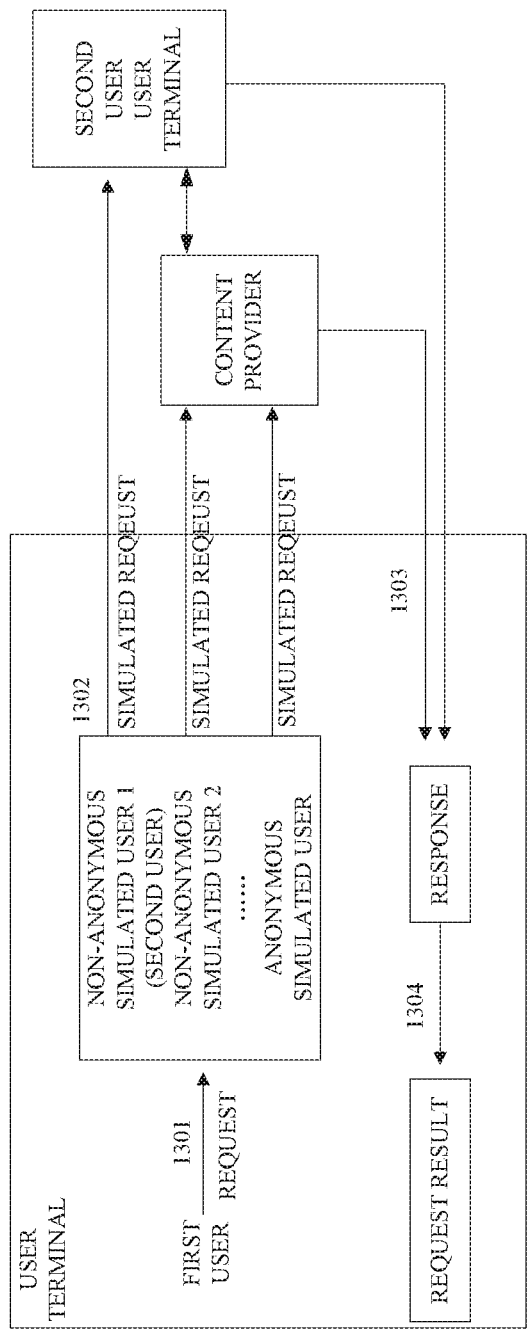

In the content providing method according to the embodiment of the disclosure, its main operations may be executed in the user terminal, as shown in FIGS. 12 and 13. For example, the simulator and the filter may be installed on the user terminal. The simulator and the filter may be implemented by a hardware component, a software component, or a combination thereof.

User terminals illustrated in FIGS. 12 to 19 refer to a user terminal used by a user (a first user) enter a request to a provider.

Referring to FIG. 12, the user terminal of the first user may obtain the request of the user at operation 1201, select a simulated user in a simulated user pool, generate a simulated request corresponding to each simulated user, transmit the simulated request to the content provider at operation 1202, receive a response returned by the content provider based on the simulated request at operation 1203, determine a request result to be provided to the first user from the returned response at operation 1204, and provide the request result to the first user.

Referring to FIG. 13, in one embodiment of the disclosure, when a second user is taken as a simulated user to send a simulated request, the user terminal of the first user may obtain a request from the user at operation 1301, select a simulated user in a simulated user pool, generate a simulated request corresponding to each simulated user, transmit a simulated request of the second user to the user terminal used by the second user, and transmit other simulated requests to the content provider at operation 1302. The user terminal of the first user and the user terminal of the second user may receive a response returned by the content provider based on the simulated requests, and the user terminal of the second user may transmit the received response to the user terminal of the first user at operation 1303. The user terminal of the first user may determine a request result to be provided to the first user from the received response at operation 1304, and provide the request result to the first user.

Figure 14:
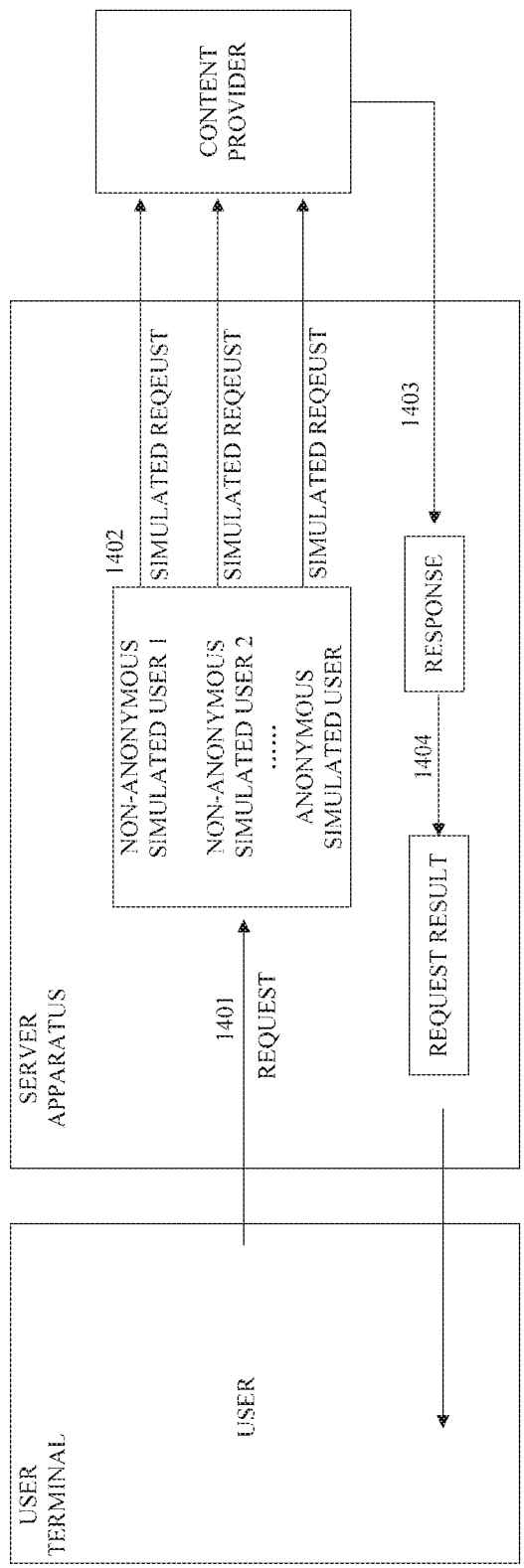
Figure 15:
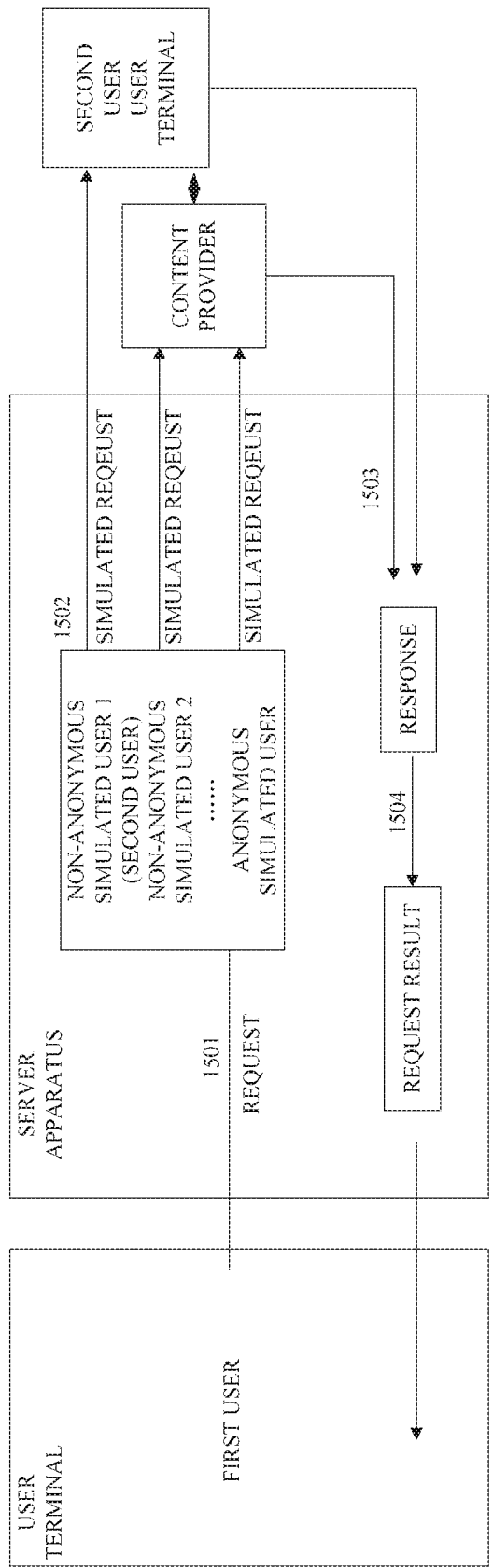

In the content providing method according to the embodiment of the disclosure, its main operations may be executed in the server apparatus, as shown in FIGS. 14 and 15. For example, the simulator and the filter may be installed on the server apparatus.

Referring to FIG. 14, the server apparatus may obtain a request of the user from the user terminal of the user at operation 1401, select a simulated user in a simulated user pool, generate a simulated request corresponding to each simulated user, transmit the simulated request to the content provider at operation 1402, receive a response returned by the content provider based on the simulated request at operation 1403, determine a request result to be provided to the first user from the returned response at operation 1404, and transmit the request result to the user terminal of the first user.

Referring to FIG. 15, in one embodiment of the disclosure, when a second user is taken as a simulated user to send a simulated request, the server apparatus may obtain a request from the user at operation 1501, select a simulated user in a simulated user pool, generate a simulated request corresponding to each simulated user, transmit a simulated request of the second user to the user terminal used by the second user, and transmit other simulated requests to the content provider at operation 1502. The server apparatus and the user terminal of the second user may receive a response returned by the content provider based on the simulated requests, and the user terminal of the second user may transmit the received response to server apparatus at operation 1503. The server apparatus may determine a request result to be provided to the first user from the received response at operation 1504, and transmit the request result to the user terminal of the first user.

Figure 16:
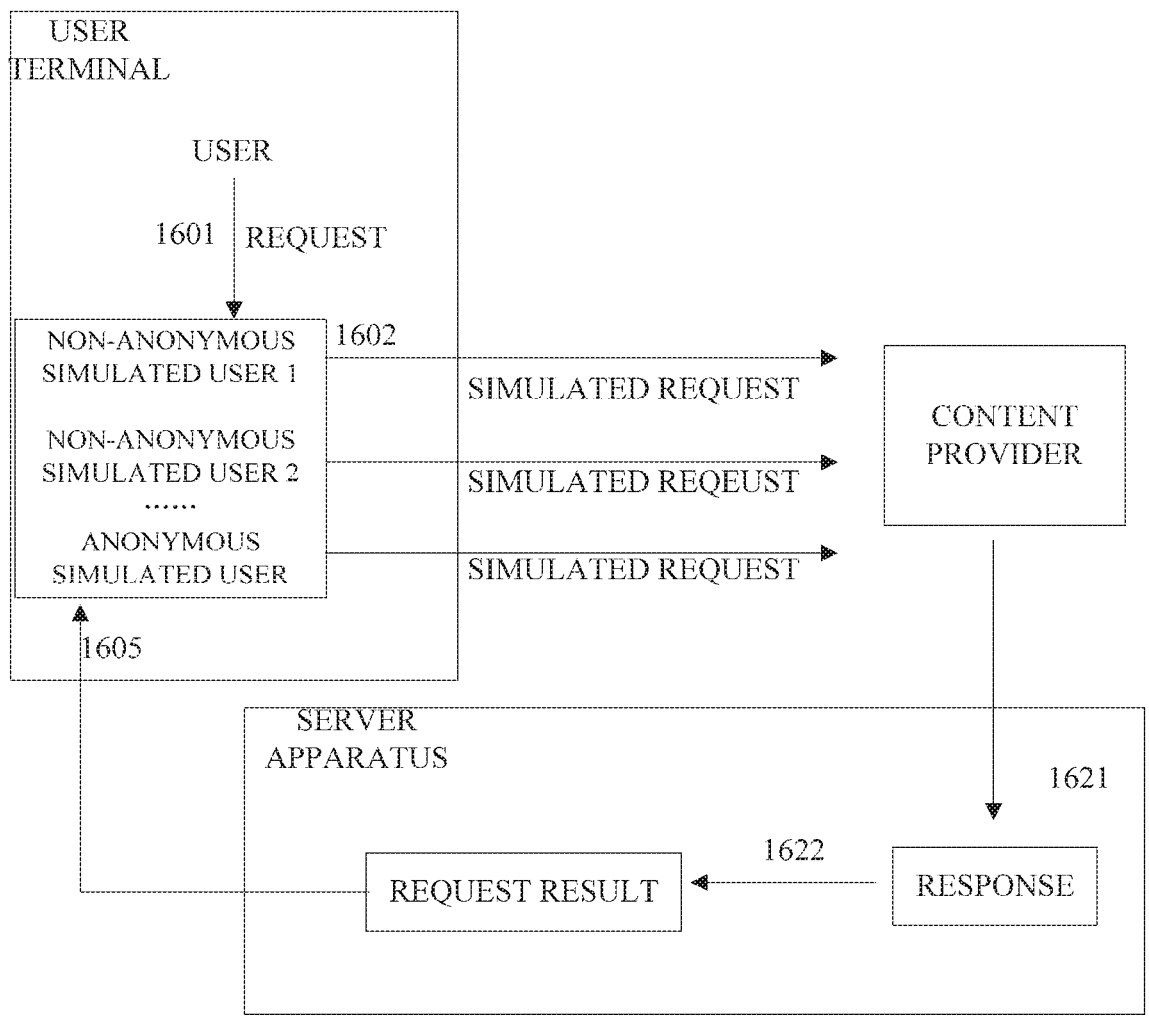
Figure 17:
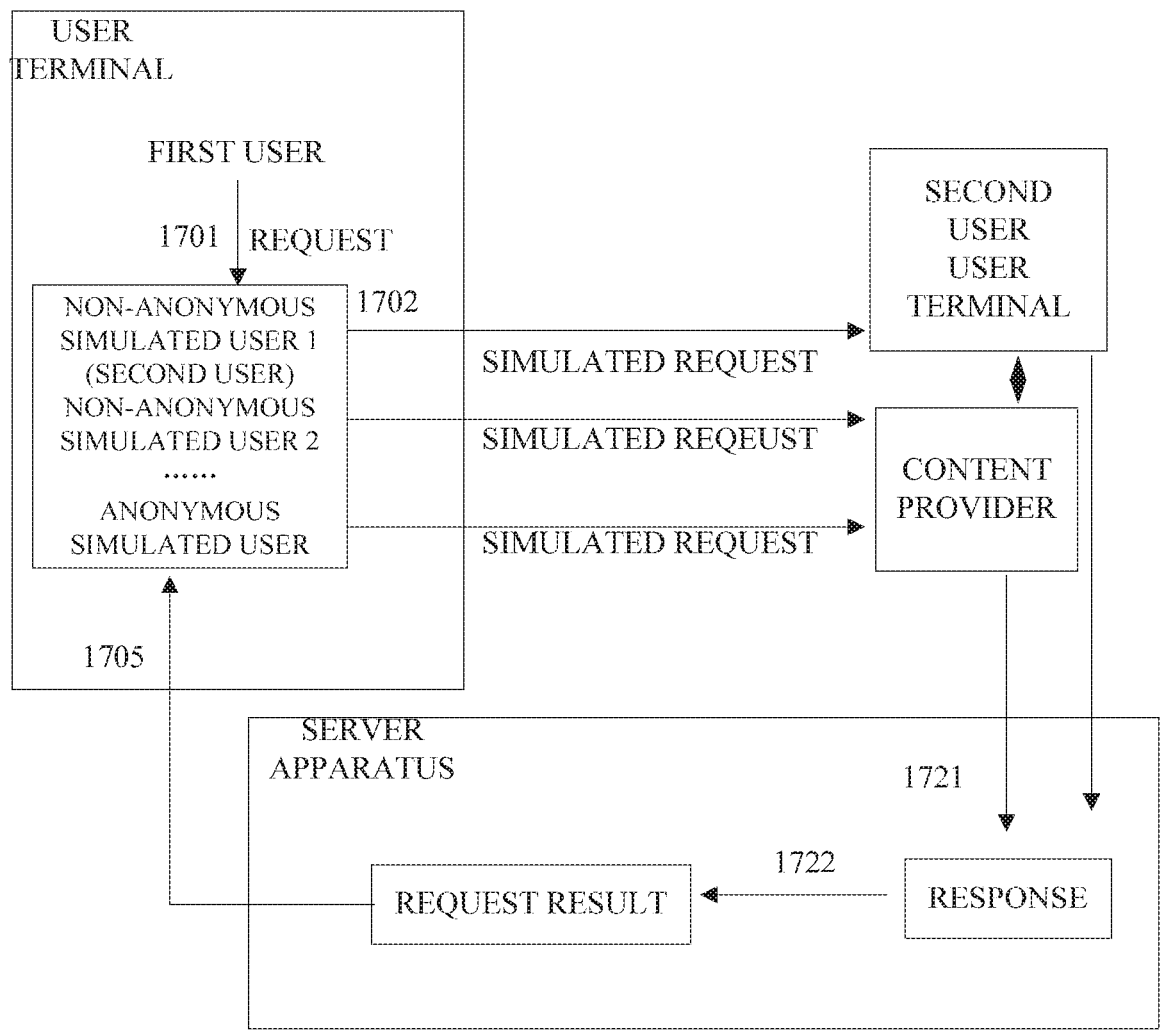

In the content providing method according to the embodiment of the disclosure, some of its operations may be executed in the user terminal, and other operations may be executed in the server apparatus, as shown in FIG. 16 and FIG. 17. For example, the simulator may be installed on the user terminal, and the filter may be installed on the server apparatus.

Referring to FIG. 16, the user terminal of the user may obtain a request of the user at operation 1601, select a simulated user in a simulated user pool, generate a simulated request corresponding to each simulated user, and transmit the simulated request to the content provider at operation 1602. The server apparatus may receive a response returned by the content provider based on the simulated request at operation 1621, determine a request result to be provided to the first user from the returned response at operation 1622, and transmit the request result to the user terminal of the first user at operation 1605.

Referring to FIG. 17, in one embodiment of the disclosure, when a second user is taken as a simulated user to send a simulated request, the user terminal of the first user may obtain a request from the user at operation 1701, select a simulated user in a simulated user pool, generate a simulated request corresponding to each simulated user, transmit a simulated request of the second user to the user terminal used by the second user, and transmit other simulated requests to the content provider at operation 1702. The server apparatus and the user terminal of the second user may receive a response returned by the content provider based on the simulated requests, and the user terminal of the second user may transmit the received response to server apparatus at operation 1721. The server apparatus may determine a request result to be provided to the first user from the received response at operation 1722, and transmit the request result to the user terminal of the first user at operation 1705.

Here, in the examples of FIGS. 16 and 17, the content provider basically returns all the responses to the simulated requests to the server, and all the responses or some responses may be provided to each user terminal through the server.

Figure 18:
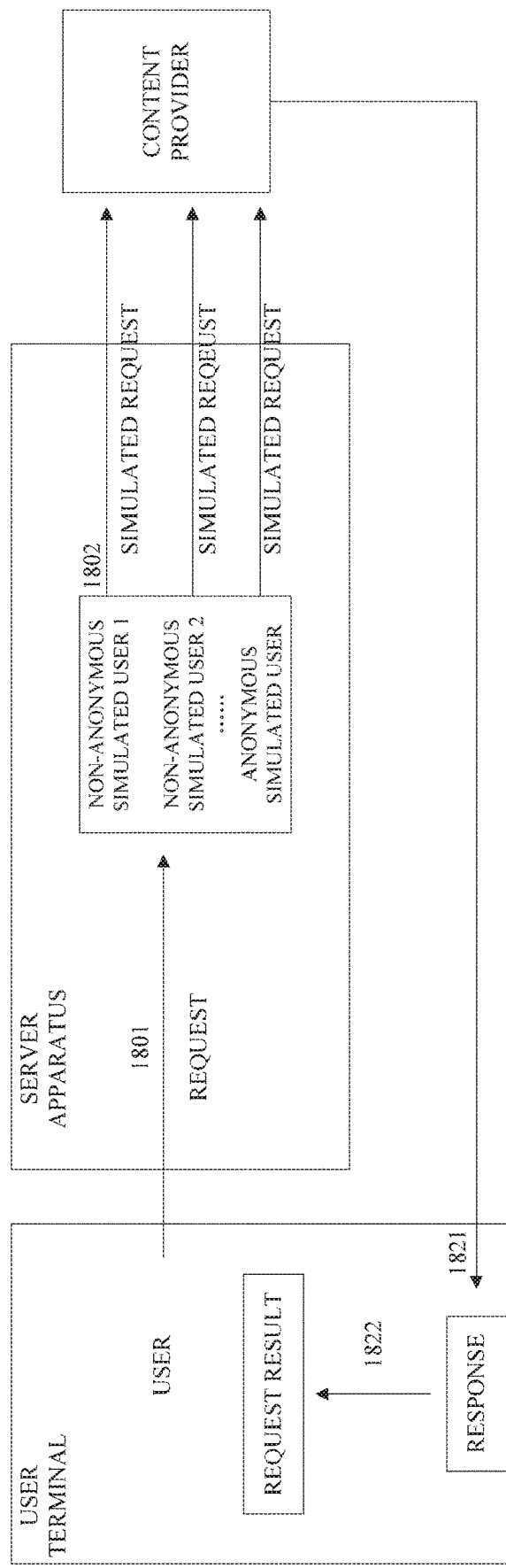
Figure 19:
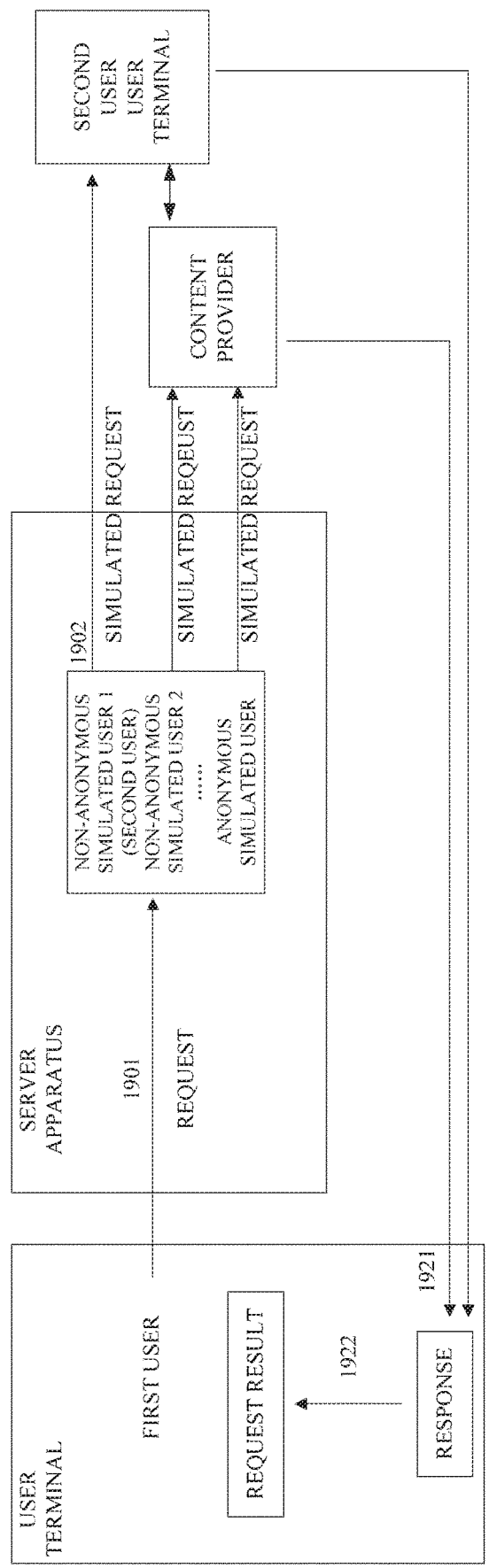

In the content providing method according to the embodiment of the disclosure, some of its operations may be executed in the user terminal, and other operations may be executed in the server apparatus, as shown in FIG. 18 and FIG. 19. For example, the simulator may be installed on the server apparatus, and the filter may be installed on the user terminal. For example, the simulator may be installed on the server apparatus, and the filter may be installed on the user terminal.

Referring to FIG. 18, the server apparatus may obtain a request of the user from the user terminal of the user at operation 1801, select a simulated user in a simulated user pool, generate a simulated request corresponding to each simulated user, and transmit the simulated request to the content provider at operation 1802. The user terminal of the user may receive a response returned by the content provider based on the simulated request at operation 1821, determine a request result to be provided to the first user from the returned response at operation 1822, and provide the request result to first user.

Referring to FIG. 19, in one embodiment of the disclosure, when a second user is taken as a simulated user to send a simulated request, the server apparatus may obtain a request from the user at operation 1901, select a simulated user in a simulated user pool, generate a simulated request corresponding to each simulated user, transmit a simulated request of the second user to the user terminal used by the second user, and transmit other simulated requests to the content provider at operation 1902. The user terminal of the first user and the user terminal of the second user may receive a response returned by the content provider based on the simulated requests, and the user terminal of the second user may transmit the received response to the user terminal of the first user at operation 1921. The user terminal of the first user may determine a request result to be provided to the first user from the received response at operation 1922, and provide the request result to the first user.

In the examples of FIGS. 18 and 19, the simulated request transmitted by the server apparatus to the content provider may contain relevant information of the user terminal, and the content provider may return a response based on the relevant information.

In FIGS. 13, 15, 17, and 19, the second user is taken as a non-anonymous simulated user 1, and accordingly, the simulated request corresponding to the second user is transmitted through the user terminal of the second user, and the response returned to the simulated request is received from the content provider through the user terminal of the second user.

The method of providing the content in the above embodiment may be implemented with referent to methods described in combination with FIGS. 2-10, and explanation thereof will not be repeated.

Applying the technical solution of the disclosure, the content provider may fail to obtain a full view of the user, thus, avoiding a case of over-user profiling or under-user profiling on the user. A plurality of features of the user may be embodied through a plurality of simulated users of which the user features are different, so that the content provider may provide the customized server content meeting a user requirement to the user according to the simulated request.

A customized type of information (namely, a customized content) and a non-customized type of information (namely, a non-customized content) obtained by the user may be balanced by applying the technical solution of the disclosure. In particular, the customized type of information is generated through the user profiling, while the non-customized type of information may be universal and widespread information which is obtained by the anonymous user who does not log in. If the user can see adequate non-customized type of information, then the user can avoid some benefit loss.

Applying the technical solution of the disclosure, user privacy can be protected, and the content provider cannot accurately correspond to the user profile to the user, so that the content provider cannot trade privacy information of the user.

A method of recommending a content to a user according to an embodiment of the disclosure is illustrated below in combination with FIG. 20. As an example, all steps of the method may be executed by a user terminal or a server; or a part of the steps of the method may be executed by the user terminal, and the other steps may be executed by the server. In one embodiment of the disclosure, the content provider may be, but is not limited to, an online platform, e.g., an online shopping platform, an online music platform, an online video platform, an online game platform. In one embodiment of the disclosure, the user's request may be a request to request online shopping platform to recommend a product, i.e., a request from the user may be one to retrieve product information, and the request may include a keyword of the product. In one embodiment of the disclosure, the user's request may be a request to request the online music platform to recommend a music, i.e., a request from the user may be one to retrieve music information, and the request may include a keyword for querying music.

The online shopping platform may recommend a commodity to the user based on the request of the user and the user profiling of the user, through which it is possible to bring the following problem: with respect to the use whose purchase possibility is high (for example, a high purchase ability user, a user in urgent need of a certain commodity, and etc.), the online shopping platform may deliberately not recommend the commodity with high cost performance, or the recommended commodity has a price higher than a price of the commodity when the commodity is recommended to another user, for example, the content provider sorts the search results of the request based on the user profiling, so as to recommend a high price result, while the user can only accept the feedback of the content provider passively, which results in benefit loss of the user.

The online music platform may push or return a song by customization to the user according to a search history of the user. In particular, the online music platform may recommend a song to the user based on the request of the user and the user profiling of the user, which possibly brings the following problem: if the user recently searches a certain type of music on the online music platform, then this type of music is redundantly recommended to the user, resulting in that the user can hardly obtain various types of music. Even though the preference of a certain user is broad, the user is likely to be pushed with the same type of music for a long period of time when the user profile is over-profiled.

Figure 20:
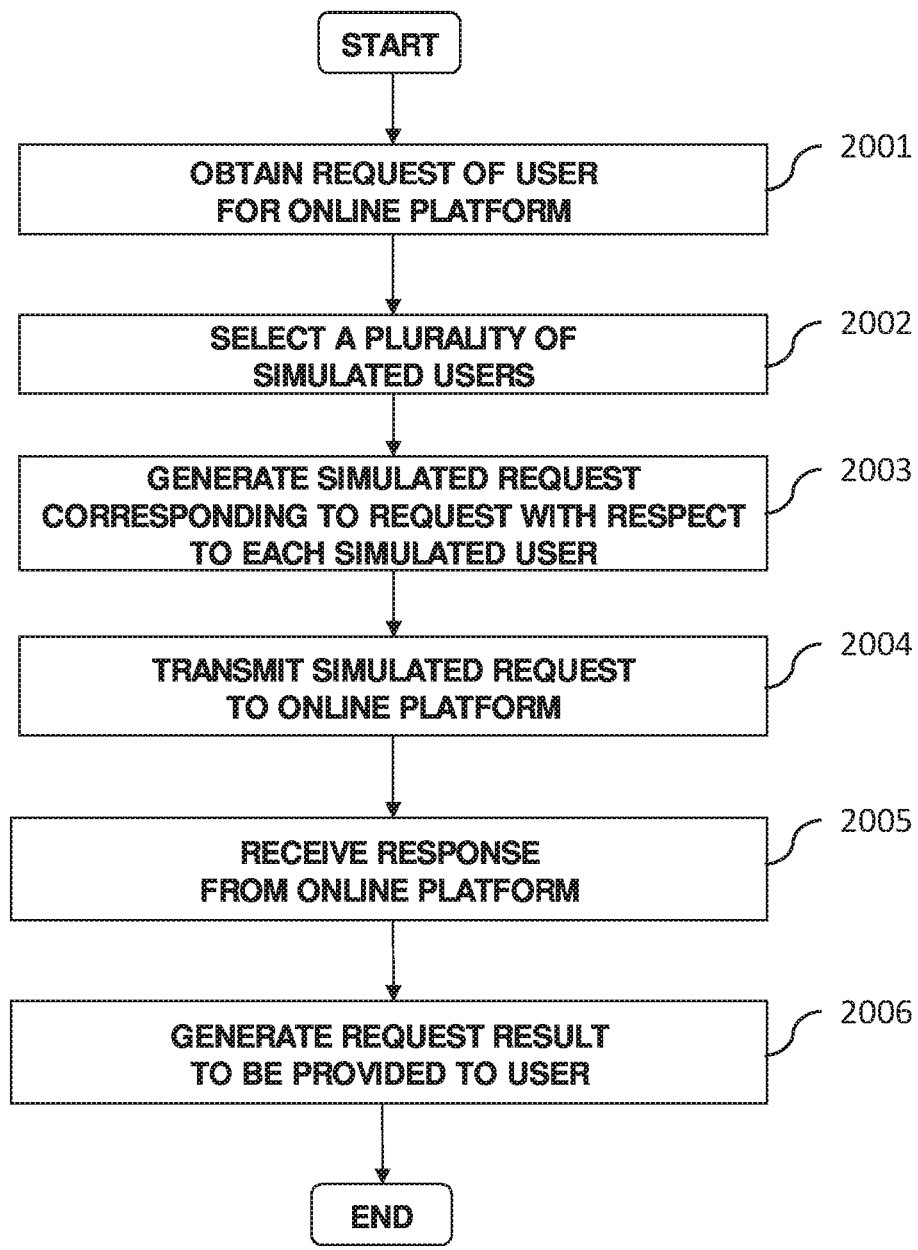
FIG. 20 illustrates a flowchart of a method of using an online platform according to an embodiment of the disclosure.

FIG. 20 illustrates a flowchart of a method of using an online platform according to an embodiment of the disclosure.

Referring to FIG. 20, at operation 2001, a request of a user for a provider may be obtained. The request of the user may be a request to request an online shopping platform to recommend a commodity. The request of the user may be a request to request an online music platform to recommend a music.

At operation 2002, a simulated user may be selected. As an example, a plurality of non-anonymous simulated users of which a correlation with a user feature of the first user or the request is higher than other simulated users, or higher than a threshold value are selected from a simulated user pool. In an embodiment of the disclosure, an anonymous simulated user may be selected.

The simulated user pool may be previously established, wherein different non-anonymous simulated users have different user features, and each non-anonymous simulated user may have a registration account corresponding to the online shopping platform. The online platform also has performed user profiling on each non-anonymous simulated user based on the registration account of the non-anonymous. In addition, the simulated user pool may also be periodically updated and synchronized in order to meet a sharing mechanism between different users.

The selected plurality of non-anonymous simulated users as a whole can represent multiple features of the first user well. Since user features of the first user are diverse, the user feature of each of the selected plurality of non-anonymous simulated users may embody an aspect of the user features of the first user. For example, the user features of the first user may include: being fond of German rock, being fond of Japanese pop music, being fond of West music and country music. The selected plurality of non-anonymous simulated users may be: the non-anonymous simulated user 1 being fond of German rock, the non-anonymous simulated user 2 being fond of Japanese pop music, and the non-anonymous simulated user 3 being fond of West music and country music. Accordingly, at the online music platform end, user profiling is performed on the non-anonymous simulated users 1-3, and the obtained user profiles may be generated as indicating that the non-anonymous simulated user 1 is fond of German rock, the non-anonymous simulated user 2 is fond of Japanese pop music, and the non-anonymous simulated user 3 is fond of West music and country music.

At operation 2003, for each of the plurality of simulated users, a simulated request corresponding to the request of the user may be generated. The simulated request may be the same as or similar to the request of the user. For one simulated user, one or more simulated requests may be generated, but are not limited thereto. For example, two or more simulated requests may be generated for one simulated user.

Preferably, each simulated request may be obtained by using a language model according to user property information of the corresponding simulated user and the request, and each simulated user may correspond to a plurality of simulated requests.

At operation 2004, a simulated request corresponding to each simulated user may be transmitted to the online platform, with an identity of the each simulated user respectively. As an example, a simulated request corresponding to each non-anonymous simulated user is transmitted to the online platform, with a registration identity of the each non-anonymous simulated user on the online platform, and a simulated request corresponding to the anonymous simulated user is transmitted to the online platform, with a non-registration identity of the anonymous simulated user on the online platform.

At operation 2005, a response may be received from the online platform. The response received from the online platform may include the content returned by the online platform in response to the simulated request.

With respect to the simulated request of the non-anonymous simulated user, the online platform may return pointed information, such as commodity information or music information based on the result of the user profiling previously performed on the non-anonymous simulated user.

At operation 2006, a request result to be provided to the user may be generated based on the received response. In one embodiment of the disclosure, the request result to be presented to the user may include a response having relatively high correlation between the simulated user and the user, or having relatively high correlation between the simulated request and the request.

In an embodiment of the disclosure, regarding the same commodity returned with respect to different simulated requests, for example the same item having the same or different prices, a comprehensive consideration may be performed, to prevent duplicated display.

In the above method, the first user may have a plurality of features, and each of the selected plurality of non-anonymous simulated users only represents a certain aspect of typical feature of the first user, but the selected plurality of non-anonymous simulated users as a whole can represent the plurality of features of the first user well, so that it is possible to use the selected plurality of non-anonymous simulated users to indirectly simulate a query action of the first user. At the aspect of the online platform, the online platform can only obtain the query action of the simulated user, while the query action of each simulated user only represents a certain feature of the first user, and the online platform can only perform user profiling on the simulated user, but cannot perform user profiling on the first user. Therefore, to a certain extent, the simulated user separates the first user from the online platform, so that the privacy of the first user can be protected well. Moreover, the content is acquired through a plurality of simulated users having different user features, so that the first user can obtain more comprehensive, overall, and transparent information, for example, commodity information or music information. Further, the online platform is prevented from using a user profile of the first user against the user.

According to an embodiment of the disclosure, because the plurality of non-anonymous simulated users interacting with the online music platform instead of the first user are sufficiently diverse, diverse music complying with a user requirement can be provided to the user in one aspect, and user privacy can be protected in the other aspect.

Figure 21:
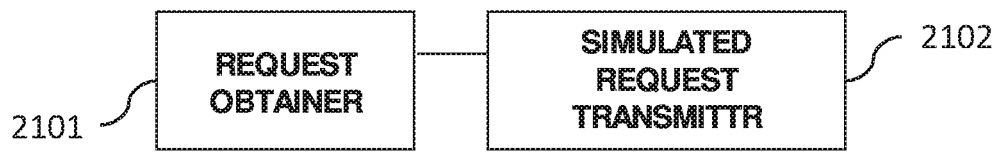
FIG. 21 illustrates a block diagram of an apparatus of requesting a content according to an embodiment of the disclosure.

FIG. 21 illustrates a block diagram of an apparatus of requesting a content according to an embodiment of the disclosure. Here, the apparatus may be set in the user terminal or in the server apparatus.

Referring to FIG. 21, the apparatus of requesting the content according to the embodiment of the disclosure includes a request obtainer 2101 and a simulated request transmitter 2102.

In particular, the request obtainer 2101 is configured to acquire a request of a first user which is used for requesting a content provider to provide a content.

As an example, when a current application is an electronic business application, the content which is requested to be provided by the content provider may include retrieved commodity information. When a current application is an information retrieve application, the content which is requested to be provided by the content provider may include an information retrieve result. When a current application is a multi-media content playing application, the content which is requested to be provided by the content provider may include retrieved multi-media content information.

The simulated request transmitter 2102 is configured to transmit, to the content provider, a simulated request corresponding to the request.

As an example, the simulated request transmitter 2102 may include: a simulated user selector, a simulated request obtainer, and a transmitter.

The simulated user selector is configured to select a simulated user.

As an example, the simulated user selector may select the simulated user from a simulated user pool, based on a correlation between the simulated user and the first user, and/or based on a correlation between the simulated user and the request.

As an example, the selected simulated user may include an anonymous simulated user.

As an example, the simulated user pool may include at least one of: a simulated user pool corresponding to the first user; a simulated user pool corresponding to the content provider; and a simulated user pool corresponding to a current application.

As an example, the simulated user in the simulated user pool may be obtained by clustering a collected request for requesting a content provider to provide a content.

As an example, the simulated user selector may select the simulated user from the simulated user pool, based on a correlation between a user feature of the simulated user and a user feature of the first user, and/or based on a correlation between the user feature of the simulated user and the request.

As an example, the user feature of the simulated user may be a user feature obtained by performing user profiling based on a history request which corresponds to the simulated user and is used for requesting a content provider to provide a content; and/or the user feature of the first user may be a user feature obtained by performing user profiling based on a history request which corresponds to the first user and is used for requesting a content provider to provide a content.

As an example, with respect to each simulated user in the simulated user pool respectively, the simulated user selector may determine a comprehensive correlation of the each simulated user relating to the first user and the request, based on a correlation between the each simulated user and the first user, and a correlation between the each simulated user and the request; and may select the simulated user from the simulated user pool, based on the comprehensive correlation of the each simulated user in the simulated user pool relating to the first user and the request.

The simulated request obtainer is configured to acquire the simulated request corresponding to the selected simulated user according to the request.

As an example, the simulated request obtainer may take the request as the simulated request corresponding to the selected simulated user; and/or generate the simulated request corresponding to the selected simulated user, according to the request and user property information of the selected simulated user.

The transmitter is configured to transmit, to the content provider, the simulated request corresponding to the selected simulated user.

As an example, the simulated request obtainer may be further configured to generate a corresponding random simulated request respectively, with respect to each simulated user; and the transmitter may transmit the random simulated request to the content provider.

As an example, the transmitter may transmit the corresponding simulated request to the content provider with user information of the selected simulated user corresponding to the content provider.

As an example, the selected simulated user includes another user (a second user), and the transmitter may transmit, to the content provider, the simulated request corresponding to the second user, through the user terminal of the second user.

As an example, when the apparatus of requesting the content is set in the user terminal of the first user, the apparatus may further include: a receiver is configured to receive, from the server apparatus, a content to be provided to the first user, which is determined by the server apparatus based on a content returned by the content provider in response to the simulated request.

Figure 22:
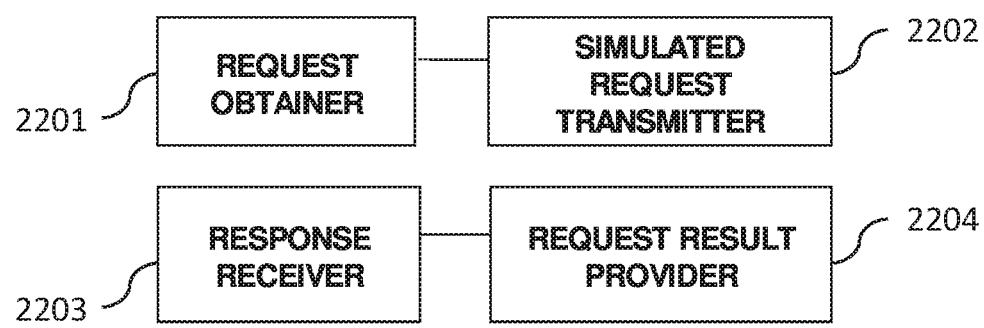
FIG. 22 illustrates a block diagram of an apparatus of requesting a content according to an embodiment of the disclosure.

FIG. 22 illustrates a block diagram of an apparatus of requesting a content according to an embodiment of the disclosure. Here, the apparatus may be set in the user terminal or in the server apparatus.

Referring to FIG. 22, the apparatus of requesting the content according to the embodiment of the disclosure includes: a request obtainer 2201, a simulated request transmitter 2202, a response receiver 2203, and a request result provider 2204. The request obtainer 2201 and the simulation request transmitter 2202 may be implemented by referring to methods described previously and the request obtainer 2101 and the simulation request transmitter 2102 in FIG. 21, and explanation thereof is not repeated.

The response receiver 2203 is configured to receive a response returned by a content provider in response to a simulated request. In one embodiment of the disclosure, the response may include a content returned by the content provider.

The request result provider 2204 is configured to determine a request result to be provided to the first user, based on the received response. The request result may be selected from the returned content.

As an example, the request result provider 2204 may select the content to be provided to the first user from the received content, based on a correlation between the simulated user corresponding to the simulated request and the first user, or a correlation between the simulated request and the request, and provide the selected content as the request result.

As an example, the request result provider 2204 may select the content to be provided to the first user from the received content, based on a correlation between a user feature of the simulated user corresponding to the simulated request and a user feature of the first user, or based on a correlation between the simulated request and the request.

For example, with respect to the received content returned in response to each simulated request respectively, the request result provider 2204 may determine a comprehensive correlation of the content returned in response to the each simulated request relating to the first user and the request, based on a correlation between a simulated user corresponding to the each simulated request and the first user, and a correlation between the each simulated request and the request. The content to be provided to the first user may be selected from the received content based on the comprehensive correlation of the received content returned in response to the each simulated request relating to the first user and the request.

In an embodiment of the disclosure, the selected simulated user includes a second user, and the response receiver 2203 may acquire a response returned by the content provider in response to the simulated request transmitted by a user terminal of the second user, through the user terminal of the second user.

As an example, when the apparatus of requesting the content is set in the server apparatus, the apparatus of requesting the content may provide the request result to the user by transmitting the request result determined to be provided to the user.

Figure 23:
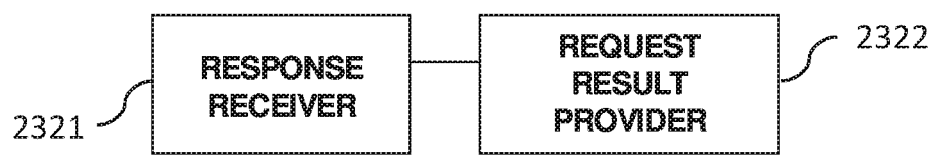
FIG. 23 illustrates a block diagram of an apparatus of providing a content according to an embodiment of the disclosure.

FIG. 23 illustrates a block diagram of an apparatus of providing a content according to an embodiment of the disclosure. Here, the apparatus may be set in the user terminal or in the server apparatus.

Referring to FIG. 23, the apparatus of providing the content according to the embodiment of the disclosure includes a response receiver 2321, and a request result provider 2322.

The response receiver 2321 and the request result provider 2322 of the content providing apparatus perform substantially the same functions as the response receiver 2203 and the request result provider 2204 described in FIG. 22, and explanation thereof are not repeated.

As an example, when the apparatus of providing the content is set in the server apparatus, the apparatus of providing the content may provide the request result to the user by transmitting the request result determined to be provided to the user.

It should be understood that, a specific way of implementing the apparatus of requesting the content and the apparatus of providing the content according to the embodiment of the disclosure may be carried out by referring to a relevant implementing way described in combination with FIGS. 2-21, and is not repeated herein.

Figure 24:
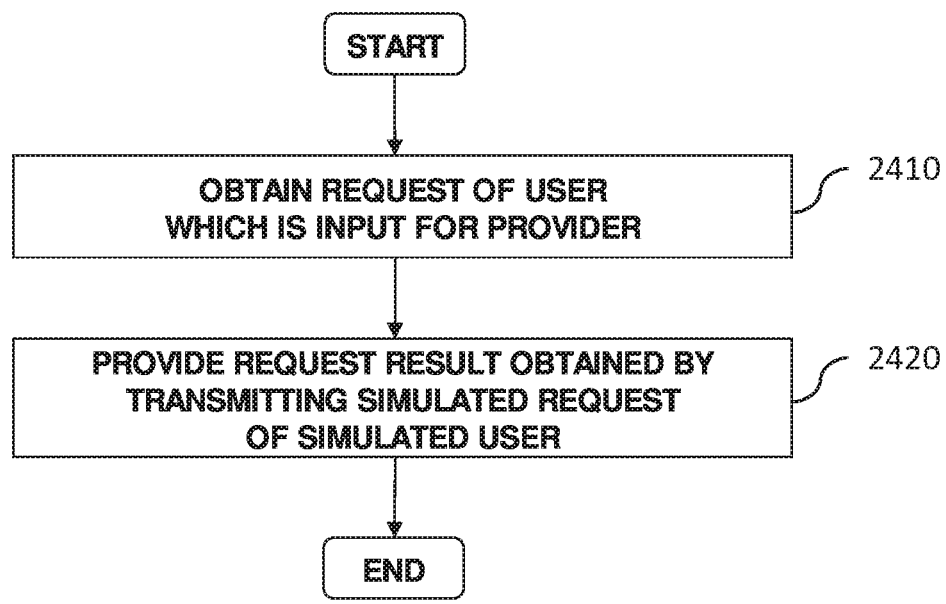
FIG. 24 illustrates a flowchart of a method according to an embodiment of the disclosure.

FIG. 24 illustrates a flowchart of a method according to an embodiment of the disclosure.

Referring to FIG. 24, at operation 2410, a user terminal (an electronic device) of a user may obtain a request of the user which is input for a provider.

Figure 25:
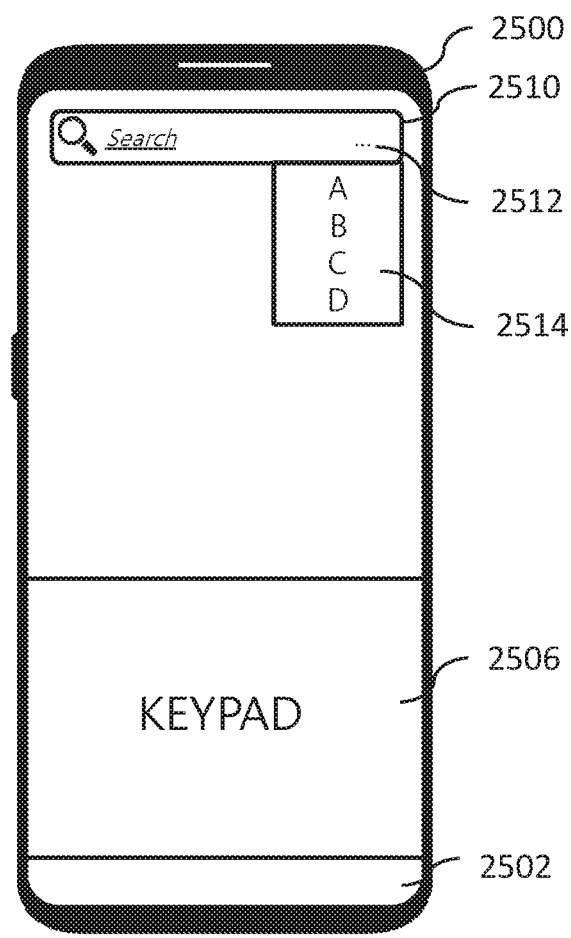
FIG. 25 illustrates a user interface for inputting a request according to an embodiment of the disclosure.

A user interface for entering the request to the provider is explained by referring FIG. 25.

FIG. 25 illustrate a user interface for inputting a request according to an embodiment of the disclosure.

Referring to FIG. 25, the user may enter the request to the provider via a user terminal 2500. The user terminal 2500 may display a basic interface 2502 including a home button or the like. The user terminal 2500 may display a search field 2510. The search field 2510 may be called out by swiping a home screen of the user terminal 2500. The search field 2510 may be used to retrieve information stored in a user terminal, but may be used to enter a request for a provider. For example, search field 2510 may be used to search for information provided by the provider. The search field 2510 may be provided by a platform where a plurality of providers are accessible. The platform may be, but is not limited to, operated by a manufacturer of the user terminal.

A user's request may be input in the search field 2510. The user's request may be input via the keypad 2506 of the user terminal 2500, but is not limited thereto. For example, the user's request may be input via voice, gestures, pictures, and the like. For example, the user may enter keywords for goods, music, video, and the like to be searched in the search field 2510. The search field 2510 may include a provider selection button 2512. When the provider selection button 2512 is selected by the user, a provider list 2514 may be displayed. The provider list 2514 may include all of the providers that can be provided by the user terminal, or may include some providers, for example, a user-favorite provider, or a user-selected provider. The user may select a provider in the provider list 2514. The user may select a plurality of providers.

In one embodiment of the disclosure, without user's direct selection of a provider, an appropriate provider may be selected by the user terminal 2500 by analyzing the request of the user. For example, if the user enters a product name in the search field 2510, the online shopping platform may be automatically selected as a provider. The automatically selected provider may be the user's favorite provider or the user-selected provider. Further, a plurality of providers may be selected. Various methods can be used to analyze the input text of the user, and a description thereof will be omitted.

Referring back to FIG. 24, at operation 2420, the user terminal may provide a request result obtained by transmitting a simulated request of a simulated user to the provider.

Figure 26:
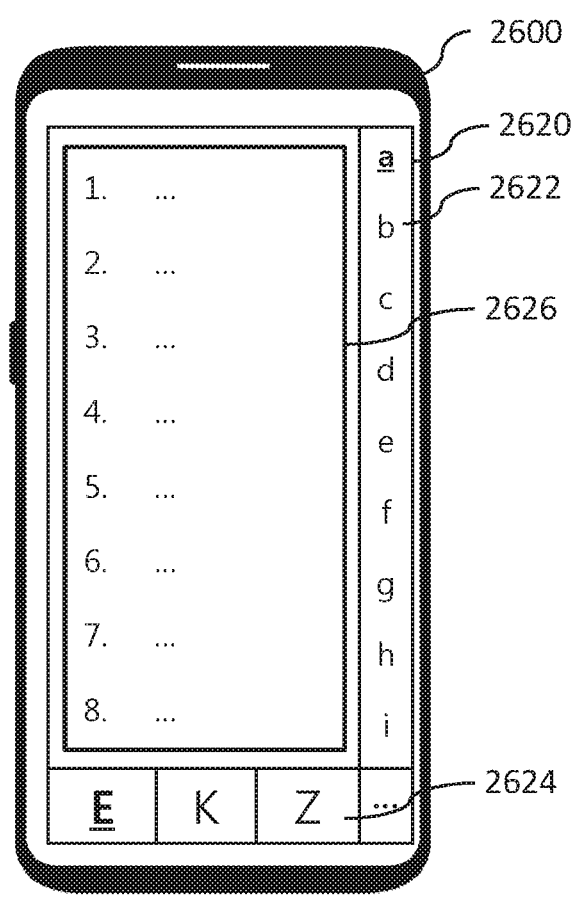
FIG. 26 illustrates a user interface for providing a request result according to an embodiment of the disclosure.

A user interface for providing the request result is explained by referring to FIG. 26.

FIG. 26 illustrate a user interface for providing a request result according to an embodiment of the disclosure.

Referring to FIG. 26, a user terminal 2600 may display an interface 2620 for providing an obtained request result. The interface 2620 may include a request result 2626.

According to one embodiment of the disclosure, a simulated request may be sent to a plurality of providers. A request result may be generated based on responses of a plurality of providers to the simulated request. The process of generating a request result based on a response of a provider to a simulated request is described above, and redundant description is omitted.

Referring to FIG. 26, the interface 2620 may include a provider-tab 2624 for selecting a provider. For example, when "E" is selected, a request result 2626 generated based on responses received from "E" provider may be displayed. Through the provider-tab 2624, the user may see check responses of various providers to the simulated request.

Referring to FIG. 26, the interface 2620 may include a simulated-user-tab 2622 for selecting a simulated user. As described above, a plurality of simulated requests may be sent to the provider based on a plurality of simulated users, and a response to each simulated request may be received from the provider. Of all the responses, a response that best matches the user or the user's request, for example, a response with the highest correlation or satisfying a predetermined criterion may be selected and provided as a request result. In one embodiment of the disclosure, items that are ranked high in each response may be provided as a request result. For example, simulated requests may be sent to a provider via "a", "b", "c", . . . "i" simulated users, and all or a part of responses from the provider may be provided to the user as a request result. Referring to FIG. 26, a response to the simulated request transmitted via "a" simulated user is displayed as the request result 2626. Through the simulated-user-tab 2622, the user may browse responses to simulated responses of various simulated users.

The provider-tab 2624, and simulated-user-tab 2622 are referred to as a tap, but may be implemented in various appearance. For example, provider-tab 2624 and simulated-user-tab 2622 may be implemented by a scrollbars, such as provider-tab 2624 and simulated-user-tab 2622. The user can change a provider and a simulated user by moving a scrollbar.

According to an embodiment of the disclosure, a computer readable storage media storing a computer program is further provided, wherein the method of requesting the content as described in the above embodiment is implemented when the computer program is executed by a processor.

According to an embodiment of the disclosure, an electronic device is further provided, wherein the electronic device may include a processor and a storage storing a computer program, wherein the method of requesting the content as described in the above embodiment is implemented when the computer program is executed by the processor.

According to an embodiment of the disclosure, a computer readable storage media storing a computer program is further provided, wherein the method of providing the content as described in the above embodiment is implemented when the computer program is executed by a processor.

According to an embodiment of the disclosure, an electronic device is further provided, wherein the electronic device may include a processor and a storage storing a computer program, wherein the method of providing the content as described in the above embodiment is implemented when the computer program is executed by the processor.

The above-described user terminal may be an electronic device including a processor and a memory. The electronic device may include at least one processor.

The memory is a computer-readable medium and may store data necessary for operation of the electronic device. For example, the memory may store instructions that, when executed by a processor of the electronic device, cause the processor to perform operations in accordance with the embodiments described above. Instructions may be included in a program.

The processor may be coupled to the memory to control the overall operation of the electronic device. For example, the processor may perform operations according to various embodiments.

The computer readable storage media is any data storage device which may store data read by a computer system. Examples of the computer readable storage media include: a read only memory, a random access memory, a read only optical disk, a magnetic type, a floppy disk, an optical storage device, and a wave carrier (for example, data transmission via a wire or wireless transmission path through Internet).

In addition, it should be understood that various units or components in the apparatus of providing the content, the apparatus of requesting the content, the device according to the embodiment of the disclosure may be implemented as a hardware component, a software component, or a combination thereof. According to defined processing performed by each of the units, those skilled in the art may implement each of the units for example by using a Field Programmable Gate Array (FPGA) or an Application Specific Integrated Circuit (ASIC).

In addition, the method of providing the content and the method of requesting the content according to the embodiment of the disclosure may be implemented as a computer code in a computer readable recording medium. Those skilled in the art may implement the computer code according to the descriptions of the above method. When the computer code is executed in a computer, the above method of the disclosure is implemented.

The various embodiments may be represented using functional block components and various operations. Such functional blocks may be realized by any number of hardware and/or software components configured to perform specified functions. For example, the various embodiments may employ various integrated circuit components, e.g., memory, processing elements, logic elements, look-up tables, and the like, which may carry out a variety of functions under control of at least one microprocessor or other control devices. As the elements of the various embodiments are implemented using software programming or software elements, the various embodiments may be implemented with any programming or scripting language, such as C, C++, Java, assembler, or the like, including various algorithms that are any combination of data structures, processes, routines or other programming elements. Functional aspects may be realized as an algorithm executed by at least one processor. Furthermore, the embodiment's concept may employ related techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

Various functions described above may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The term "computer readable program code" includes any type of computer code, including source code, object code, and executable code. The term "computer readable medium" includes any type of medium capable of being accessed by a computer, such as a read only memory (ROM), a random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. In the disclosure, any device operated by software, such as, computer programs may be referred to as a computer program product. The computer program product may refer to or include the non-transitory computer readable medium. The computer program product refers to a computer program or an application, and the computer readable medium may include a wave carrier (for example, data transmission via a wired or wireless communication), but is not limited thereto.

Various embodiments of the disclosure should be understood as various examples, and should not be interpreted as limitation of various embodiments. For the sake of brevity, related electronics, control systems, software development and other functional aspects of the systems may not be described in detail. Furthermore, the lines or connecting elements shown in the appended drawings are intended to represent functional relationships and/or physical or logical couplings between the various elements. It should be noted that many alternative or additional functional relationships, physical connections or logical connections may be present in a practical device. Moreover, no item or component is essential to the practice of the various embodiments unless it is specifically described as "essential" or "critical."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a memory storing instructions; and
   at least one processor configured to execute the instructions to:
      obtain a request of a user which is input for a provider,
      transmit to the provider a plurality of simulated requests of a plurality of simulated users corresponding to the request,
      select at least one response from among a plurality of response received from the provider based on at least one of a first correlation between the request of the user and each of the plurality of simulated requests and a second correlation between the user and each of the plurality of simulated users, and
      provide the user with the selected at least one response as a result of the provider to the plurality of simulated requests.

2. The electronic device of claim 1, wherein the plurality of simulated users comprise a simulated user having an identity registered with the provider.

3. The electronic device of claim 1, wherein the plurality of simulated users comprise a simulated user having an anonymous identity on the provider.

4. The electronic device of claim 1, wherein the plurality of simulated users comprise another user different from the user.

5. The electronic device of claim 4, wherein the plurality of simulated requests are transmitted to the provider via another electronic device of the other user.

6. The electronic device of claim 1, wherein the plurality of simulated users are selected from a pool of simulated users based on the user.

7. The electronic device of claim 1, wherein the plurality of simulated users are selected from a pool of simulated users based on the request of the user.

8. The electronic device of claim 1, wherein the plurality of simulated users are selected from a pool of simulated users based on the provider.

9. The electronic device of claim 1,
   wherein the plurality of simulated users are selected from a pool of simulated users, and
   wherein the plurality of simulated users are shared between the user and another user.

10. The electronic device of claim 1,
    wherein the plurality of simulated users are selected from a pool of simulated users, and
    wherein the plurality of simulated users are updated by transmitting a randomly generated simulated request to the provider.

11. The electronic device of claim 1, wherein the plurality of simulated requests are generated based on the request of the user.

12. The electronic device of claim 1, wherein, when the plurality of response respectively comprise a plurality of items, the result comprises a top-ranked item in each of the at least one response.

13. The electronic device of claim 1, wherein the result comprises the at least one response sorted in a certain order.

14. The electronic device of claim 1, wherein the request of the user is obtained by the user inputting the request in a platform where a plurality of providers including the provider are accessible.

15. The electronic device of claim 1,
    wherein the plurality of responses are browsable by selecting a simulated user from among the plurality of simulated users in the result provided to the user.

16. A method comprising:
    obtaining a request of a user which is input for a provider;
    transmitting to the provider a plurality of simulated requests of a plurality of simulated users corresponding to the request;
    selecting at least one response from among a plurality of response received from the provider based on at least one of a first correlation between the request of the user and each of the plurality of simulated requests and a second correlation between the user and each of the plurality of simulated users; and
    providing the user with the selected at least one response as a result of the provider to the plurality of simulated requests.

17. A computer program product comprising non-transitory computer readable medium comprising at least one program which, when executed by at least one processor, causes the at least one processor to:
    obtain a request of a user which is input for a provider,
    transmit to the provider a plurality of simulated requests of a plurality of simulated users corresponding to the request;
    select at least one response from among a plurality of response received from the provider based on at least one of a first correlation between the request of the user and each of the plurality of simulated requests and a second correlation between the user and each of the plurality of simulated users, and
    provide the user with the selected at least one response as a result of the provider to the plurality of simulated requests.

18. The electronic device of claim 1, wherein contents of the plurality of simulated requests are identical to or similar with the request of the user.

* * * * *